(12) United States Patent
Zhang et al.

(10) Patent No.: US 11,553,389 B2
(45) Date of Patent: Jan. 10, 2023

(54) METHOD FOR CONTROLLING TERMINAL TO USE WIRELESS NETWORK AND RELATED DEVICE

(71) Applicant: HUAWEI TECHNOLOGIES CO., LTD., Guangdong (CN)

(72) Inventors: Biao Zhang, Shenzhen (CN); Xuzu Shu, Dongguan (CN); Jun Zuo, Dongguan (CN); Wanling Ye, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 35 days.

(21) Appl. No.: 16/991,581

(22) Filed: Aug. 12, 2020

(65) Prior Publication Data
US 2020/0374772 A1 Nov. 26, 2020

Related U.S. Application Data

(63) Continuation of application No. PCT/CN2019/074854, filed on Feb. 12, 2019.

(30) Foreign Application Priority Data

Feb. 13, 2018 (CN) .......................... 201810148015.0

(51) Int. Cl.
*H04W 4/00* (2018.01)
*H04W 36/14* (2009.01)
*H04W 36/24* (2009.01)

(52) U.S. Cl.
CPC .......... *H04W 36/14* (2013.01); *H04W 36/24* (2013.01)

(58) Field of Classification Search
CPC ................. H04W 36/14; H04W 36/24; H04W 36/00835; H04W 36/385
(Continued)

(56) References Cited

U.S. PATENT DOCUMENTS 8,711,846 B2 4/2014 Mahdi et al.
2010/0329243 A1 12/2010 Buckley et al.
(Continued)

FOREIGN PATENT DOCUMENTS

CN 101534535 A 9/2009
CN 102404738 A 4/2012
(Continued)

OTHER PUBLICATIONS

Office Action issued in Chinese Application No. 201810148015.0 dated Jul. 5, 2021, 12 pages (with English translation).
(Continued)

*Primary Examiner* — Marcos Batista
(74) *Attorney, Agent, or Firm* — Fish & Richardson P.C.

(57) ABSTRACT

This application provides a method for controlling a terminal to use a wireless network, a system, and a related device. The method includes: obtaining, by a network decision device, service information of a terminal, constructing network use indication information, and delivering the network use indication information to a network trigger device; and triggering, by the network trigger device based on the network use indication information, the terminal to use a wireless network corresponding to the service information. According to the method, an operator can assign, based on a service requirement of the operator, the terminal to use a specific wireless network, so that the terminal can use in time a wireless network that is consistent with a requirement of the operator. This helps improve network use efficiency for the operator, and can prevent a service of the terminal from being affected.

10 Claims, 19 Drawing Sheets

---

801. A PS core network device receives fifth network use indication information, wherein the fifth network use indication information includes a terminal identifier of the terminal and fifth available wireless network set 803. The PS core network device sends sixth network use indication information, to indicate a receiver of the sixth network use indication information to trigger the terminal to use a wireless network in the fifth available wireless networks, wherein the sixth network use indication information includes the terminal identifier and all or a part of the fifth available wireless network set

(58) Field of Classification Search
USPC .................................. 455/312, 436; 370/331
See application file for complete search history.

(56) References Cited

U.S. PATENT DOCUMENTS

2013/0165121 A1* 6/2013 Zhao ................ H04W 36/0011
455/436
2015/0365862 A1* 12/2015 Teyeb .................... H04W 36/14
455/436
2016/0219625 A1 7/2016 Lee et al.

FOREIGN PATENT DOCUMENTS

| CN | 104349386 A | 2/2015 |
| CN | 105813152 A | 7/2016 |
| CN | 106454749 A | 2/2017 |
| EP | 3310100 A1 | 4/2018 |
| WO | 2011044725 A1 | 4/2011 |
| WO | 2016175578 A1 | 11/2016 |
| WO | 2017028288 A1 | 2/2017 |

OTHER PUBLICATIONS

Office Action issued in Chinese Application No. 201810148015.0 dated Dec. 25, 2020, 6 pages.
Extended European Search Report issued in European Application No. 19755241.7 dated Jan. 28, 2021, 13 pages.
Corici et al., "Enhanced access network discovery and selection in 3GPP Evolved Packet Core," 3rd IEEE LCN Workshop on Use Mobility and Vehicular Networks, Oct. 20, 2009, 6 pages.
PCT International Search Report and Written Opinion issued in International Application No. PCT/CN2019/074854 dated May 6, 2019.

* cited by examiner

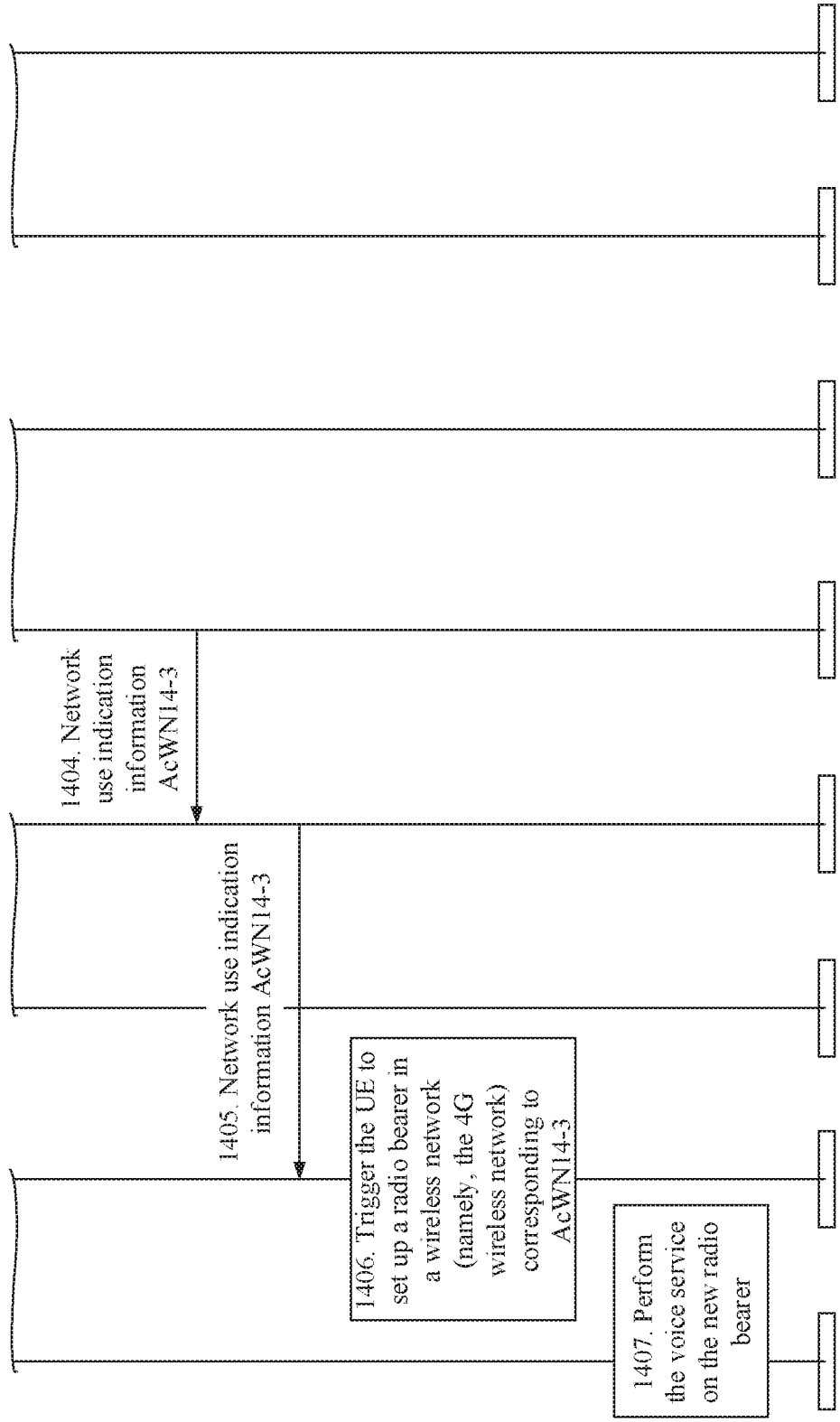

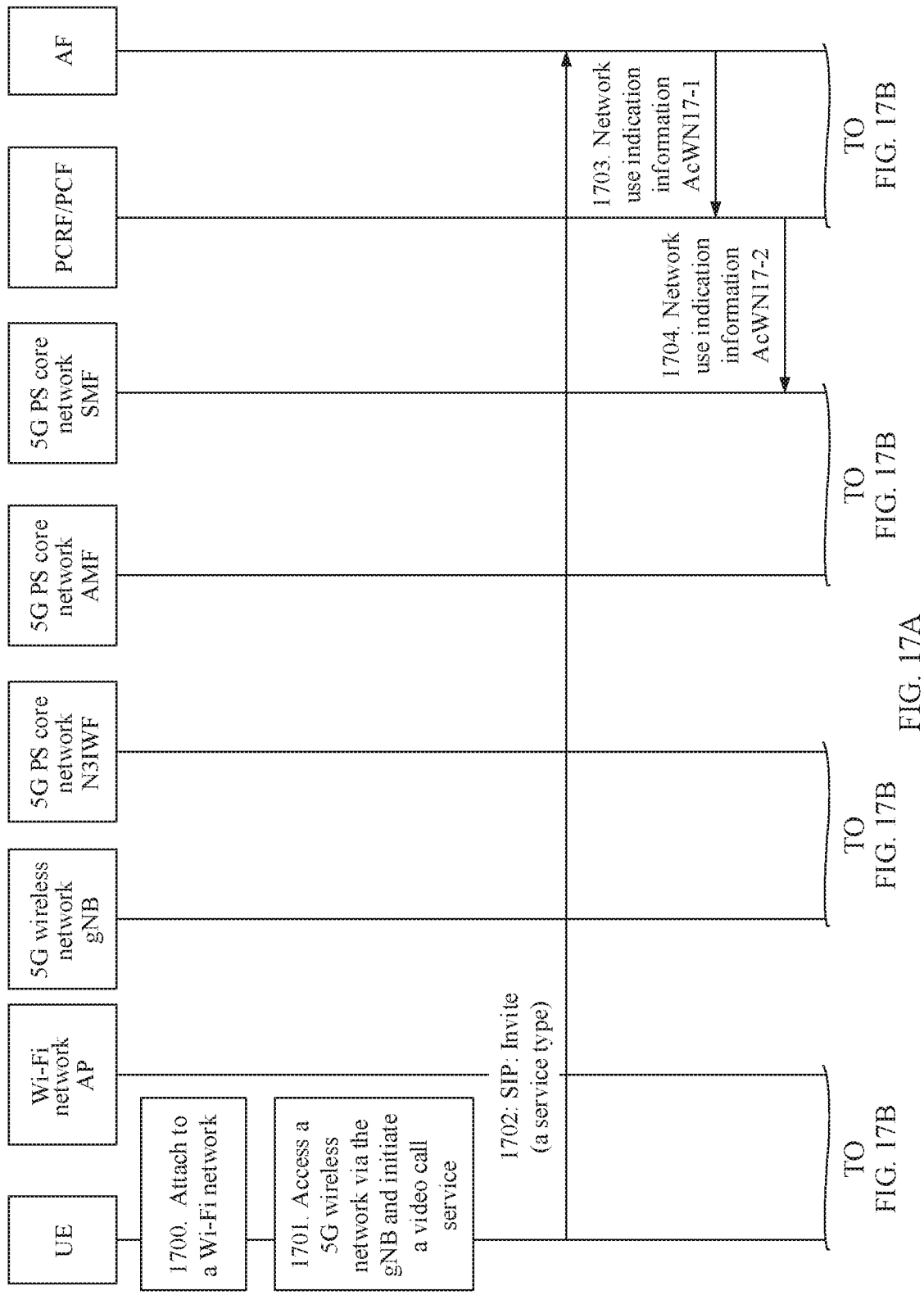

METHOD FOR CONTROLLING TERMINAL TO USE WIRELESS NETWORK AND RELATED DEVICE

CROSS-REFERENCE TO RELATED APPLICATIONS

This disclosure is a continuation of International Application No. PCT/CN2019/074854, filed on Feb. 12, 2019, which claims priority to Chinese Patent Application No. 201810148015.0, filed on Feb. 13, 2018, The disclosures of the aforementioned applications are hereby incorporated by reference in their entireties.

TECHNICAL FIELD

This application relates to the communications field, and in particular, to a method for controlling a terminal to use a wireless network and a related device.

BACKGROUND

With the development of mobile internet applications, the internet applications pose challenges to a carrier network. For example, requirements are imposed on wide network coverage, a low latency, and a high bandwidth. In the future, coexistence of a 5G wireless network with a 4G wireless network will last for a long time. To meet different network requirements of upper-layer applications, many operators may expect to utilize network resources more effectively. For example, voice services are provided in the 4G wireless network, taking full advantage of a wide coverage of the 4G wireless network, and high-definition video services are provided in the 5G wireless network, taking full advantage of a wide bandwidth of the 5G wireless network. Therefore, an operator requires a terminal to be capable of performing a service over a preferred wireless network.

In the prior art, a preferred wireless network may be configured on the terminal side. This solution can only meet personalized requirements of an end user instead of requirements of the operator for network resource optimization, or even a service may be affected (for example, the terminal fails to receive a call as a mobile-terminated party) because a wireless network that is configured and used by the terminal does not meet service delivery requirements of the operator.

SUMMARY

In view of this, it is necessary to provide a method for controlling a terminal to use a wireless network, to meet a requirement of an operator for determining a wireless network to be used by the terminal.

According to a first aspect, an embodiment of this application provides a method for controlling a terminal to use a wireless network, applied to a network decision device. The method includes: obtaining a terminal identifier of a terminal and service information, where the service information is information related to a service performed by the terminal; determining, based on the service information, an available wireless network set available to the terminal, where the available wireless network set includes one or more wireless networks; and sending indication information to a network trigger device, to indicate the network trigger device to trigger the terminal to use a wireless network in the available wireless network set, where the indication information includes the terminal identifier and all or a part of the available wireless network set.

According to the method, the network decision device may collect the service information of the terminal, determine, based on a requirement of an operator, one or more wireless networks corresponding to the service, and transfer these wireless networks to the network trigger device, or select a target wireless network from these wireless networks and transfer the target wireless network to the network trigger device. In this way, the operator can determine a wireless network for the terminal, and trigger, via the network trigger device, the terminal to use the determined wireless network.

In a possible solution, the sending, by the network decision device, indication information to a network trigger device includes: determining the network trigger device based on an attach status of the terminal, and sending the indication information to the determined network trigger device.

In a possible solution, the determining, by the network decision device, the network trigger device based on an attach status of the terminal, and sending the indication information to the determined network trigger device includes: determining a target wireless network from the available wireless network set; determining the network trigger device based on the attach status of the terminal and the target wireless network; and sending the indication information to the determined network trigger device, where the indication information includes the terminal identifier and the target wireless network.

In a possible solution, the determining, by the network decision device, a target wireless network from the available wireless network set includes: determining that in the available wireless network set, a wireless network with a highest priority, a wireless network with an optimal QoS indicator, or a wireless network to which the terminal has attached is the target wireless network.

In a possible solution, the network decision device is a policy control device. The obtaining, by the network decision device, a terminal identifier and service information includes: obtaining, by the policy control device, the terminal identifier and the service information from an application function device or a packet detection device. The determining, by the network decision device, the network trigger device based on the attach status of the terminal and the target wireless network includes: determining that the terminal has attached to the target wireless network, and determining that a packet core network device corresponding to the target wireless network is the network trigger device; or determining that the terminal has not attached to the target wireless network, and determining that a packet core network device corresponding to a wireless network currently used by the terminal is the network trigger device.

In a possible solution, the network decision device is a packet detection device. The obtaining, by the network decision device, a terminal identifier and service information includes: obtaining, by the packet detection device, the service information by detecting a data packet of the service. The determining, by the network decision device, the network trigger device based on the attach status of the terminal and the target wireless network includes: determining that the terminal has attached to the target wireless network, and determining that a packet core network device corresponding to the target wireless network, a radio access device corresponding to the target wireless network, a non-3GPP interworking function device corresponding to the target wireless network, or an evolved packet data gateway device corresponding to the target wireless network is the network trigger device; or determining that the terminal has not attached to the target wireless network, and determining that a packet core network device corresponding to a wireless network currently used by the terminal or a radio access device corresponding to a wireless network currently used by the terminal is the network trigger device.

In a possible solution, the network decision device is an application function device, and the obtaining, by the network decision device, a terminal identifier and service information includes: obtaining, by the application function device, the terminal identifier and the service information from a message sent by the terminal. The network trigger device is a policy control device, and the sending, by the network decision device, indication information to a network trigger device includes: sending, by the application function device, the indication information to the policy control device.

In a possible solution, the network decision device is a policy control device, and the obtaining, by the network decision device, a terminal identifier and service information includes: obtaining, by the policy control device, the terminal identifier and the service information from an application function device or a packet detection device. The network trigger device is a packet core network device corresponding to a wireless network currently used by the terminal, and the sending, by the network decision device, indication information to a network trigger device includes: sending, by the policy control device, the indication information to the packet core network device corresponding to the wireless network currently used by the terminal.

In a possible solution, the network decision device is a packet detection device, and the obtaining, by the network decision device, a terminal identifier and service information includes: obtaining, by the packet detection device, the terminal identifier and the service information by detecting a service data packet of the terminal. The network trigger device is a policy control device, a packet core network device corresponding to a wireless network currently used by the terminal, or a radio access device corresponding to a wireless network currently used by the terminal. The sending, by the network decision device, indication information to a network trigger device includes: sending, by the packet detection device, the indication information to the policy control device, the packet core network device corresponding to the wireless network currently used by the terminal, or the radio access device corresponding to the wireless network currently used by the terminal.

In a possible solution, the determining, by the network decision device, an available wireless network set based on the service information includes: determining the available wireless network set by querying information about a correspondence between service information and a wireless network.

In a possible solution, the available wireless network set further includes priority information of the one or more wireless networks.

According to a second aspect, an embodiment of this application provides a method for controlling a terminal to use a wireless network, applied to a first network trigger device. The method includes: receiving first indication information, where the first indication information includes a terminal identifier of the terminal and a first available wireless network set available to the terminal, and the first available wireless network set includes one or more wireless networks available to the terminal; and triggering the terminal to use a wireless network in the first available wireless network set to perform a service.

According to the method, the network trigger device may receive wireless networks available to a terminal that are determined by a network decision device, select a target wireless network from the available wireless network set, and trigger a terminal to use the target wireless network. In this way, the wireless network determined by an operator can be used by the terminal.

In a possible solution, the first network trigger device is a radio access device corresponding to a wireless network currently used by the terminal, and the triggering, by the first network trigger device, the terminal to use a wireless network in the first available wireless network set to perform a service includes: triggering, by the radio access device corresponding to the wireless network currently used by the terminal, the terminal to set up a radio bearer in the wireless network in the first available wireless network set after the terminal is handed over to the wireless network in the first available wireless network set, to perform the service.

In a possible solution, the triggering, by the radio access device corresponding to the wireless network currently used by the terminal, the terminal to set up a radio bearer in the wireless network in the first available wireless network set after the terminal is handed over to the wireless network in the first available wireless network set, to perform the service includes: determining, by the radio access device corresponding to the wireless network currently used by the terminal, a target wireless network from the first available wireless network set; and triggering, by the radio access device corresponding to the wireless network currently used by the terminal, the terminal to set up a radio bearer in the target wireless network after the terminal is handed over to the target wireless network, to perform the service.

In a possible solution, the determining, by the radio access device corresponding to the wireless network currently used by the terminal, a target wireless network from the first available wireless network set includes: determining that a wireless network with a highest priority or an optimal QoS indicator in the first available wireless network set is the target wireless network.

In a possible solution, the first available wireless network set includes a single wireless network, the first network trigger device is a packet core network device corresponding to the single wireless network. The triggering, by the first network trigger device, the terminal to use a wireless network in the first available wireless network set to perform a service includes: triggering, by the packet core network device corresponding to the single wireless network, the terminal to set up a radio bearer in the single wireless network to perform the service.

In a possible solution, the first available wireless network set includes a single wireless network, the first network trigger device is a radio access device corresponding to the single wireless network. The triggering, by the first network trigger device, the terminal to use a wireless network in the first available wireless network set to perform a service includes: triggering, by the radio access device corresponding to the single wireless network, the terminal to set up a radio bearer in the single wireless network to perform the service.

In a possible solution, the first available wireless network set includes a single wireless network, the first network trigger device is a non-3GPP interworking function device corresponding to the single wireless network or an evolved packet data gateway device corresponding to the single wireless network, and the triggering, by the first network trigger device, the terminal to use a wireless network in the first available wireless network set to perform a service includes: triggering, by the non-3GPP interworking function device corresponding to the single wireless network or the evolved packet data gateway device corresponding to the single wireless network, the terminal to set up a radio bearer in the single wireless network to perform the service.

In a possible solution, the triggering, by the first network trigger device, the terminal to use a wireless network in the first available wireless network set to perform a service includes: sending, by the first network trigger device, second indication information to a second network trigger device, to indicate the second network trigger device to trigger the terminal to use a wireless network in the first available wireless network set to perform the service, where the second indication information includes the terminal identifier and a second available wireless network set, and the second available wireless network set includes all or a part of the first available wireless network set.

In a possible solution, the sending, by the first network trigger device, second indication information to a second network trigger device includes: determining the second network trigger device based on an attach status of the terminal; and sending the second indication information to the determined second network trigger device.

In a possible solution, the determining, by the first network trigger device, the second network trigger device based on an attach status of the terminal, and sending the second indication information to the determined second network trigger device includes: determining a target wireless network from the first available wireless network set; determining the second network trigger device based on the attach status of the terminal and the target wireless network; and sending the second indication information to the determined second network trigger device, where the second indication information includes the terminal identifier and the target wireless network.

In a possible solution, the first network trigger device is a policy control device, and the determining, by the first network trigger device, the second network trigger device based on the attach status of the terminal and the target wireless network includes: determining that the terminal has attached to the target wireless network, and determining that a packet core network device corresponding to the target wireless network is the second network trigger device; or determining that the terminal has not attached to the target wireless network, and determining that a packet core network device corresponding to a wireless network currently used by the terminal is the second network trigger device.

In a possible solution, the first network trigger device is a packet core network device corresponding to a wireless network currently used by the terminal, and the determining, by the first network trigger device, the second network trigger device based on the attach status of the terminal and the target wireless network includes: determining that the terminal has attached to the target wireless network, and determining that a packet core network device corresponding to the target wireless network, a radio access device corresponding to the target wireless network, a non-3GPP interworking function device corresponding to the target wireless network, or an evolved packet data gateway device corresponding to the target wireless network is the second network trigger device; or determining that the terminal has not attached to the target wireless network, and determining that a radio access device corresponding to the wireless network currently used by the terminal is the second network trigger device.

In a possible solution, the determining, by the first network trigger device, a target wireless network from the first available wireless network set includes: determining that in the first available wireless network set, a wireless network with a highest priority, a wireless network with an optimal QoS indicator, or a wireless network to which the terminal has attached is the target wireless network.

According to a third aspect, an embodiment of this application provides a network decision device, including a processor and a memory. The memory is configured to store a program instruction. The processor is configured to invoke and execute the program instruction stored in the memory, to implement the method according to the first aspect.

According to a fourth aspect, an embodiment of this application provides a network trigger device, including a processor and a memory. The memory is configured to store a program instruction. The processor is configured to invoke and execute the program instruction stored in the memory, to implement the method according to the second aspect.

According to a fifth aspect, an embodiment of this application provides a computer-readable storage medium, including an instruction. When the instruction is run on a computer, the computer is enabled to perform the method according to the first aspect.

According to a sixth aspect, an embodiment of this application provides a computer-readable storage medium, including an instruction. When the instruction is run on a computer, the computer is enabled to perform the method according to the second aspect.

According to a seventh aspect, an embodiment of this application provides a method for controlling a terminal to use a wireless network, applied to a network decision device. The method includes: obtaining a terminal identifier of a terminal and service information, where the service information is information related to a service performed by the terminal; determining a QoS indicator requirement for a wireless network based on the service information, where a wireless network that meets the QoS indicator requirement is a wireless network available to the terminal; and sending indication information to a network trigger device, to indicate the network trigger device to trigger the terminal to use the wireless network that meets the QoS indicator requirement, where the indication information includes the terminal identifier and the QoS indicator requirement.

In a possible solution, the network decision device is an application function device, and the obtaining, by the network decision device, a terminal identifier and service information includes: obtaining, by the application function device, the terminal identifier and the service information from a message sent by the terminal. The network trigger device is a policy control device, and the sending, by the network decision device, indication information to a network trigger device includes: sending, by the application function device, the indication information to the policy control device.

In a possible solution, the network decision device is a policy control device, and the obtaining, by the network decision device, a terminal identifier and service information includes: obtaining, by the policy control device, the terminal identifier and the service information from an application function device or a packet detection device. The network trigger device is a packet core network device corresponding to a wireless network currently used by the terminal, and the sending, by the network decision device, indication information to a network trigger device includes: sending, by the policy control device, the indication information to the packet core network device corresponding to the wireless network currently used by the terminal.

In a possible solution, the network decision device is a packet detection device, and the obtaining, by the network decision device, a terminal identifier and service information includes: obtaining, by the packet detection device, the terminal identifier and the service information by detecting a data packet of a service of the terminal. The network trigger device is a policy control device, a packet core network device corresponding to a wireless network currently used by the terminal, or a radio access device corresponding to a wireless network currently used by the terminal. The sending, by the network decision device, indication information to a network trigger device includes: sending, by the packet detection device, the indication information to the policy control device, the packet core network device corresponding to the wireless network currently used by the terminal, or the radio access device corresponding to the wireless network currently used by the terminal.

In a possible solution, the determining, by the network decision device, a QoS indicator requirement for a wireless network based on the service information includes: determining the QoS indicator requirement for the wireless network by querying information about a correspondence between service information and a QoS indicator requirement for a wireless network.

According to the method, the network decision device may collect the service information of the terminal, determine, based on a requirement of an operator, a QoS indicator requirement of a wireless network corresponding to the service, and transfer the indicator requirement to the network trigger device, so that the operator may determine a wireless network for the terminal, and trigger, via the network trigger device, the terminal to use a wireless network that meets the determined QoS indicator requirement.

According to an eighth aspect, an embodiment of this application provides a method for controlling a terminal to use a wireless network, applied to a first network trigger device. The method includes: receiving first indication information, where the first indication information includes a terminal identifier of the terminal and a QoS indicator requirement for a wireless network, and a wireless network that meets the QoS indicator requirement is a wireless network available to the terminal; and triggering the terminal to use the wireless network that meets the QoS indicator requirement to perform a service.

In a possible solution, the first network trigger device is a radio access device corresponding to a wireless network currently used by the terminal; and the triggering, by the first network trigger device, the terminal to use the wireless network that meets the QoS indicator requirement to perform a service includes: triggering, by the radio access device corresponding to the wireless network currently used by the terminal, the terminal to set up a radio bearer in the wireless network that meets the QoS indicator requirement after the terminal is handed over to the wireless network that meets the QoS indicator requirement, to perform the service.

In a possible solution, the triggering, by the radio access device corresponding to the wireless network currently used by the terminal, the terminal to set up a radio bearer in the wireless network that meets the QoS indicator requirement after the terminal is handed over to the wireless network that meets the QoS indicator requirement, to perform the service includes: determining, by the radio access device corresponding to the wireless network currently used by the terminal, a target wireless network based on the QoS indicator requirement; and triggering, by the radio access device corresponding to the wireless network currently used by the terminal, the terminal to set up a radio bearer in the target wireless network after the terminal is handed over to the target wireless network, to perform the service.

In a possible solution, the triggering, by the first network trigger device, the terminal to use the wireless network that meets the QoS indicator requirement to perform a service includes: sending, by the first network trigger device, second indication information to a second network trigger device, to indicate the second network trigger device to trigger the terminal to use the wireless network that meets the QoS indicator requirement to perform a service, where the second indication information includes the terminal identifier and the QoS indicator requirement.

In a possible solution, the sending, by the first network trigger device, second indication information to a second network trigger device includes: determining the second network trigger device based on an attach status of the terminal; and sending the second indication information to the determined second network trigger device.

In a possible solution, the determining, by the first network trigger device, the second network trigger device based on an attach status of the terminal, and sending the second indication information to the determined second network trigger device includes: determining a target wireless network based on the QoS indicator requirement; determining the second network trigger device based on the attach status of the terminal and the target wireless network; and sending the second indication information to the determined second network trigger device, where the second indication information includes the terminal identifier and the target wireless network.

In a possible solution, the first network trigger device is a policy control device, and the determining, by the first network trigger device, the second network trigger device based on the attach status of the terminal and the target wireless network includes:

determining that the terminal has attached to the target wireless network, and determining that a packet core network device corresponding to the target wireless network is the second network trigger device; or determining that the terminal has not attached to the target wireless network, and determining that a packet core network device corresponding to a wireless network currently used by the terminal is the second network trigger device.

In a possible solution, the first network trigger device is a packet core network device corresponding to a wireless network currently used by the terminal, and the determining, by the first network trigger device, the second network trigger device based on the attach status of the terminal and the target wireless network includes: determining that the terminal has attached to the target wireless network, and determining that a packet core network device corresponding to the target wireless network, a radio access device corresponding to the target wireless network, a non-3GPP interworking function device corresponding to the target wireless network, or an evolved packet data gateway device corresponding to the target wireless network is the second network trigger device; or determining that the terminal has not attached to the target wireless network, and determining that a radio access device corresponding to the wireless network currently used by the terminal is the second network trigger device.

According to the method, the network trigger device may receive the QoS indicator requirement for a wireless network determined by a network decision device, determine a target wireless network based on the QoS indicator requirement, and trigger the terminal to use the target wireless network, so that a wireless network determined by an operator can be used by the terminal.

According to a ninth aspect, an embodiment of this application provides a network decision device, including a processor and a memory. The memory is configured to store a program instruction. The processor is configured to invoke and execute the program instruction stored in the memory, so that the network decision device performs the method according to the seventh aspect.

According to a tenth aspect, an embodiment of this application provides a network trigger device, including a processor and a memory. The memory is configured to store a program instruction. The processor is configured to invoke and execute the program instruction stored in the memory, so that the network trigger device performs the method according to the eighth aspect.

According to an eleventh aspect, an embodiment of this application provides a computer-readable storage medium, including an instruction. When the instruction is run on a computer, the computer is enabled to perform the method according to the seventh aspect.

According to a twelfth aspect, an embodiment of this application provides a computer-readable storage medium, including an instruction. When the instruction is run on a computer, the computer is enabled to perform the method according to the eighth aspect.

BRIEF DESCRIPTION OF DRAWINGS

FIG. 14A and FIG. 14B are a flowchart of a method for controlling a terminal to use a preferred wireless network according to an embodiment of this application;

FIG. 17A and FIG. 17B are a flowchart of a method for controlling a terminal to use a preferred wireless network according to an embodiment of this application:

DESCRIPTION OF EMBODIMENTS

The following describes the technical solutions in the embodiments of this application with reference to the accompanying drawings in the embodiments of this application.

Embodiment 1

Figure 1:
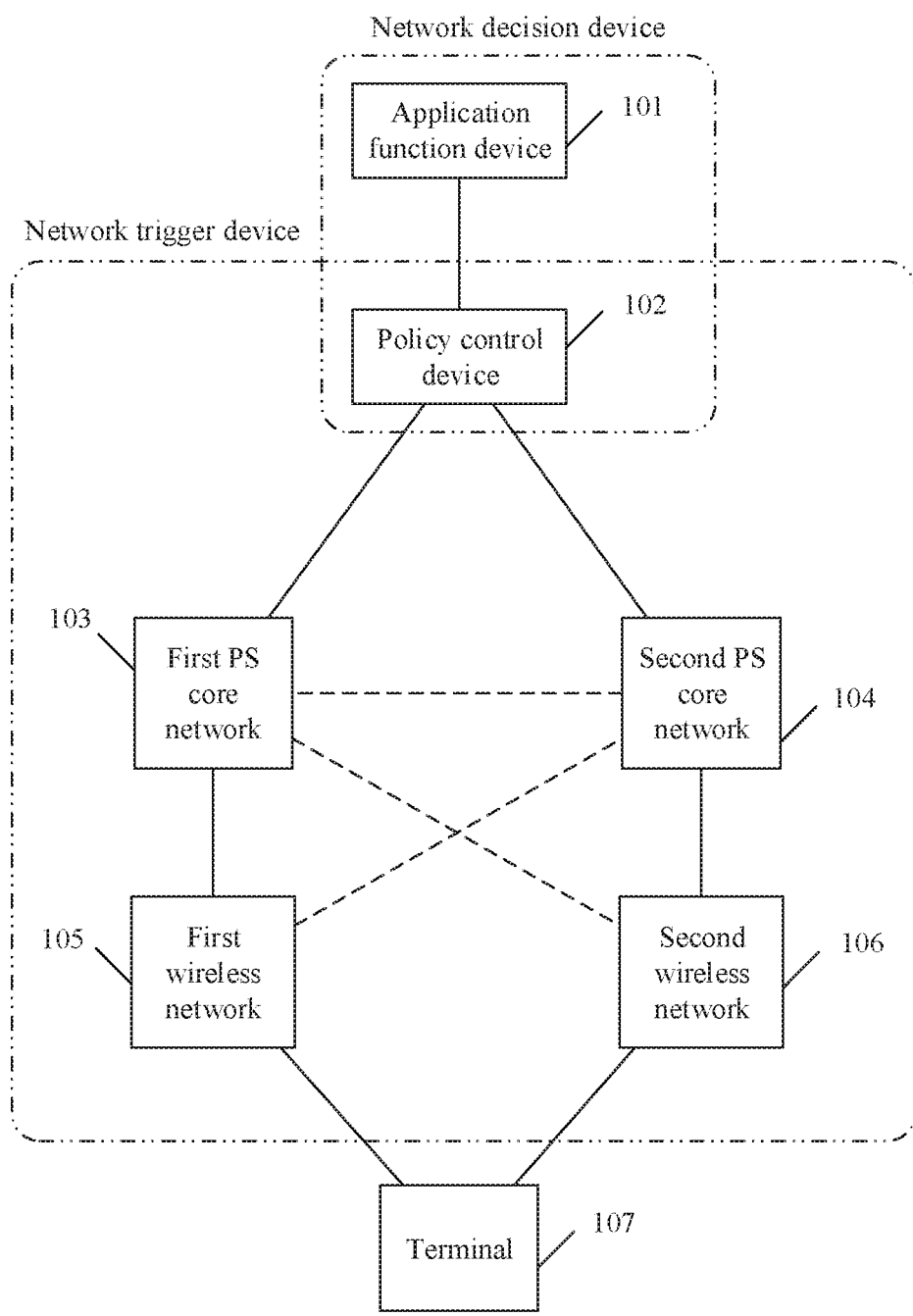
FIG. 1 is a schematic architectural diagram of a system for controlling a terminal to use a wireless network according to an embodiment of this application.

FIG. 1 is a schematic architectural diagram of a system for controlling a terminal to use a wireless network according to an embodiment of this application. The system includes two devices: a network decision device and a network trigger device, which are separately described as follows:

The network decision device may be configured to: obtain a terminal identifier of a terminal 107 and service information of the terminal 107; determine, based on the service information, an available wireless network set available to the terminal 107; and send the terminal identifier and the available wireless network set to the network trigger device through a message, so that the network trigger device triggers the terminal 107 to use a wireless network in the available wireless network set.

The network trigger device may be configured to: obtain the terminal identifier of the terminal 107 and the available wireless network set available to the terminal 107 from the network decision device, and trigger the terminal 107 to use the wireless network in the available wireless network set, for example, select a target wireless network from the available wireless network set, and trigger the terminal 107 to use the target wireless network. When a network trigger device cannot directly trigger the terminal to use the wireless network in the available wireless network set, the network trigger device may transfer the available wireless network set to another network trigger device, and the another network trigger device triggers the terminal 107 to use the wireless network in the available wireless network set. Similarly, the another network trigger device may further transfer the available wireless network set to still another network trigger device, and so on. This is not described in detail.

In addition to the descriptions of the foregoing two devices, the terminal 107, a first wireless network 105, a second wireless network 106, a first packet switched core network (PS core network) 103, a second PS core network 104, a policy control device 102, and an application function device 101 that are included in the architectural diagram shown in FIG. 1 are further described as follows:

Application Function Device 101

The application function device 101 may perform the functions of the network decision device, that is, may obtain the terminal identifier and the service information from the terminal 107, determine wireless networks available to the terminal 107 based on the service information, and send the terminal identifier and the service information to the policy control device 102 through a message, to indicate the policy control device 102 to trigger the terminal 107 to use a wireless network in the available wireless network set to perform a service.

Alternatively, the application function device 101 may provide the terminal identifier and the service information for the network decision device (for example, the policy control device 102), so that the network decision device determines the available wireless network set for the terminal 107 based on the service information.

The application function device 101 may be an application function (AF) device or an application server (AS) in the 3rd generation partnership project (3GPP) standard.

Policy Control Device 102

The policy control device 102 may perform the functions of the network decision device, that is, may receive the terminal identifier of the terminal 107 and the service information from the application function device 101, determine, based on the service information, an available wireless network set available to the terminal 107, and send the terminal identifier and the available wireless network set to a device in the first PS core network 103 or a device in the second PS core network 104 through a message, so that the device in the first PS core network 103 or the device in the second PS core network 104 triggers the terminal 107 to use a wireless network in the available wireless network set.

Alternatively, the policy control device 102 may perform the functions of the network trigger device, that is, may receive the terminal identifier of the terminal 107 and the wireless network set available to the terminal 107 from the application function device 101, and send the terminal identifier and the available wireless network set to a device in the first PS core network 103 or a device in the second PS core network 104 through a message, so that the device in the first PS core network 103 or the device in the second PS core network 104 triggers the terminal 107 to use a wireless network in the available wireless network set.

The policy control device 102 may be a policy control function (PCF) device or a policy and charging rules function (PCRF) device in the 3GPP standard.

PS Core Network

In FIG. 1, there are only two PS core networks: the first PS core network 103 and the second PS core network 104. In actual deployment, there may be more core networks. The PS core network herein may be a 5G PS core network, a 4G PS core network, or the like. This is not limited in the embodiments of this application.

A device in the PS core network (referred to as a PS core network device) in FIG. 1 may perform the functions of the network trigger device, that is, may receive the terminal identifier of the terminal 107 and wireless networks available to the terminal 107 from the policy control device 102, and send the terminal identifier and the available wireless network set to the first wireless network 105 or the second wireless network 106 through a message, so that the first wireless network 105 or the second wireless network 106 triggers the terminal 107 to use a wireless network in the available wireless network set.

A 5G PS core network device includes an access and mobility management function (AMF) device, a session management function (SMF) device, and the like. A 4G PS core network device includes a mobility management entity (MME), a packet data network gateway (PDN Gateway, PGW) device, and the like. All these 5G PS core network devices and 4G PS core network devices can perform the functions of the network trigger device.

Wireless Network

In FIG. 1, there are only two wireless networks: the first wireless network 105 and the second wireless network 106. In actual deployment, there may be more wireless networks, such as a Wi-Fi wireless network, a 5G wireless network, a 4G wireless network, and a 3G wireless network.

A device in the wireless network (for example, a radio access device) in FIG. 1 may perform the functions of the network trigger device, that is, may receive the terminal identifier of the terminal 107 and an available wireless network set available to the terminal 107 from the PS core network device, and trigger the terminal 107 to use a wireless network in the available wireless network set to perform a service.

In an actual wireless network, a radio access device in the wireless network, for example, a new radio NodeB (gNB, also referred to as a 5G wireless network base station) or an evolved NodeB (eNB, also referred to as a 4G wireless network base station), may perform the functions of the network trigger device described in this embodiment. In a Wi-Fi wireless network, a Non-3GPP interworking function (N3IWF) device that connects the Wi-Fi wireless network to the 5G PS core network may perform the functions of the network trigger device. Alternatively, an evolved packet data gateway (ePDG) device that connects the Wi-Fi wireless network to the 4G PS core network may perform the functions of the network trigger device.

The terminal 107 may be configured to use, when triggered by the network trigger device, the wireless network in the available wireless network set determined by the network decision device, to be specific, set up a radio bearer in the wireless network in the available wireless network set to perform a service. The terminal 107 may be a mobile phone of a user, or may be another mobile device that can access a wireless network of an operator, for example, an internet of things mobile device. In FIG. 1, there is only one terminal. In actual deployment, there may be a plurality of terminals.

It should be uniformly noted that in all the embodiments of this application:

The "terminal identifier" may be an international mobile subscriber identity (IMSI) of the terminal, an internet protocol address (IP address) of the terminal, a phone number of the terminal, or other information of the terminal that can be used to locate and address the terminal from a network side. This is not limited in the embodiments of this application. In a process of transferring the terminal identifier, because different networks (a core network, a wireless network, and the like) have different terminal addressing requirements, conversion may be performed, for example, a phone number may be converted into an IP address. This belongs to the prior art, and details are not described in this application.

The "service" may be a service performed on the terminal, a service used by the terminal, a service consumed by the terminal, or a service consumed by an end user, for example, a voice call service, a video call service, or a video play service.

The "service information" may be a service type, a service identifier, or other related information of a service, for example, a device type or a capability type of a terminal (for example, an internet of things terminal or a mobile phone terminal), or a screen type of a terminal (for example, a large-screen terminal or a small-screen terminal), or a type in another dimension. This is not limited in this application. For ease of description, in some embodiments of this application, a service type or a device type is used as an example only for description, and may be replaced by other related information of a service.

The "performing a service" may refer to that the terminal performs a service, uses a service, or consumes a service, or may refer to that an end user consumes a service.

The "available wireless network" is a wireless network that the terminal can be triggered to use, and may be a corresponding wireless network preset by a network side (for example, an operator) based on service information or other information, or may be a corresponding wireless network dynamically determined by the network side based on service information or other information. The available wireless network set may include one or more available wireless networks. The "available wireless network" preset by the operator is generally a preferred wireless network. In other words, the terminal can perform a service with a better effect through the preset or dynamically determined wireless network, than through another wireless network, wherein the better effect includes but is not limited to optimization of network resources, a smoother service, better user experience, or the like.

The "transferring/including a wireless network" may refer to transferring/including an address of a wireless network device, or transferring/including an identifier of a wireless network device, or transferring/including a wireless network type, and so on, or transferring/including other related information that may be used by the network trigger device to determine a wireless network. Details are not described in subsequent embodiments of this application.

That "a terminal uses a wireless network" refers to that a terminal establishes a wireless channel and/or sets up a radio bearer in the wireless network, to perform a service. When the terminal has not attached to the wireless network, the terminal may first attach to the wireless network through a wireless network handover procedure defined by the 3GPP, and then set up a radio bearer in the wireless network.

Embodiment 2

Figure 2:
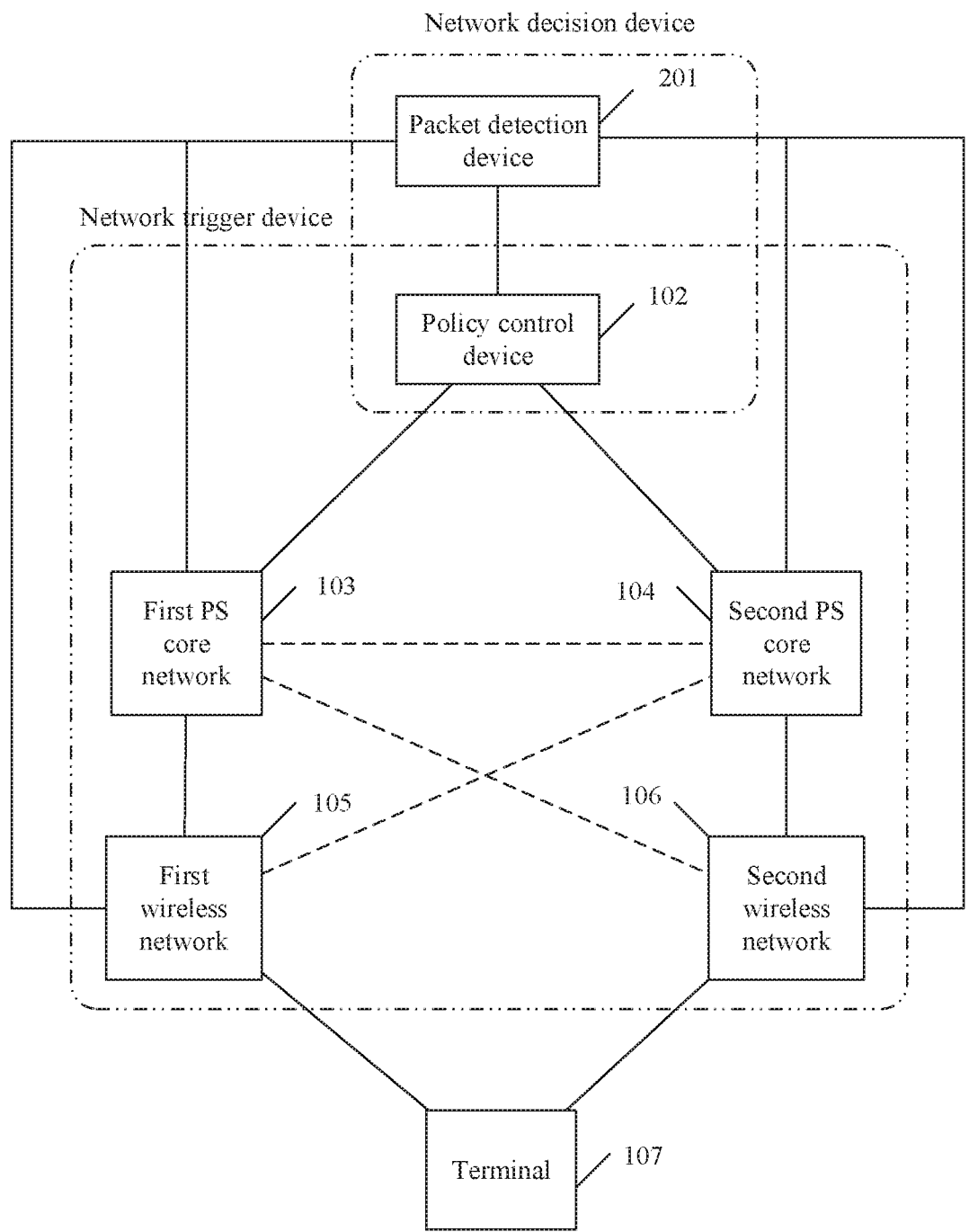
FIG. 2 is a schematic architectural diagram of a system for controlling a terminal to use a wireless network according to an embodiment of this application.

In the foregoing architecture, an application function device at an application layer initiates a requirement for triggering a terminal to use a wireless network. In this case, the application function device needs to be within a control range of an operator. In a case in which the AF device is beyond the control range of the operator, a packet detection device may be deployed in a communications network (for example, may be deployed in a data gateway), as shown in FIG. 2, to obtain service information of the terminal, so as to initiate a requirement for triggering the terminal to use a wireless network. FIG. 2 is a schematic architectural diagram of a system for controlling a terminal to use a wireless network according to an embodiment of this application.

Similar to the architectural diagram shown in FIG. 1, the architectural diagram shown in FIG. 2 also includes two network side devices: a network decision device and a network trigger device. Networks or devices shown in FIG. 2 are the same as those in FIG. 1 (refer to networks or devices in FIG. 2 that have same numerals as those in FIG. 1) except that the application function device 101 in FIG. 1 is replaced by the packet detection device 201 in FIG. 2.

The packet detection device 201 may analyze a data packet of a service of a terminal 107 to obtain service information of the terminal 107. The packet detection device 201 may perform the functions of the network decision device based on the service information obtained through analysis. To be specific, the packet detection device 201 may determine, based on the service information, a wireless network available to the terminal 107; and the network trigger device (for example, a policy control device 102, a device in a first PS core network 103, a device in a second PS core network 104, a device in a first wireless network 105, or a device in a second wireless network 106) triggers the terminal 107 to use the available wireless network. Alternatively, the packet detection device 201 may provide the service information, obtained through analysis, of the terminal 107 for the network decision device (for example, the policy control device 102), so that the network decision device determines an available wireless network for the terminal 107.

According to the system architectures shown in FIG. 1 and FIG. 2, the technical solution provided in this embodiment of this application enables an operator to control a terminal to use a wireless network. To be specific, the network decision device determines, based on service information of the terminal, an available wireless network set available to the terminal, and then the network trigger device triggers the terminal to use a wireless network in the available wireless network set. This prevents a service from being affected because a wireless network used by the terminal is inconsistent with a requirement of the operator. The following describes the technical solution in further embodiments.

Embodiment 3

Figure 3:
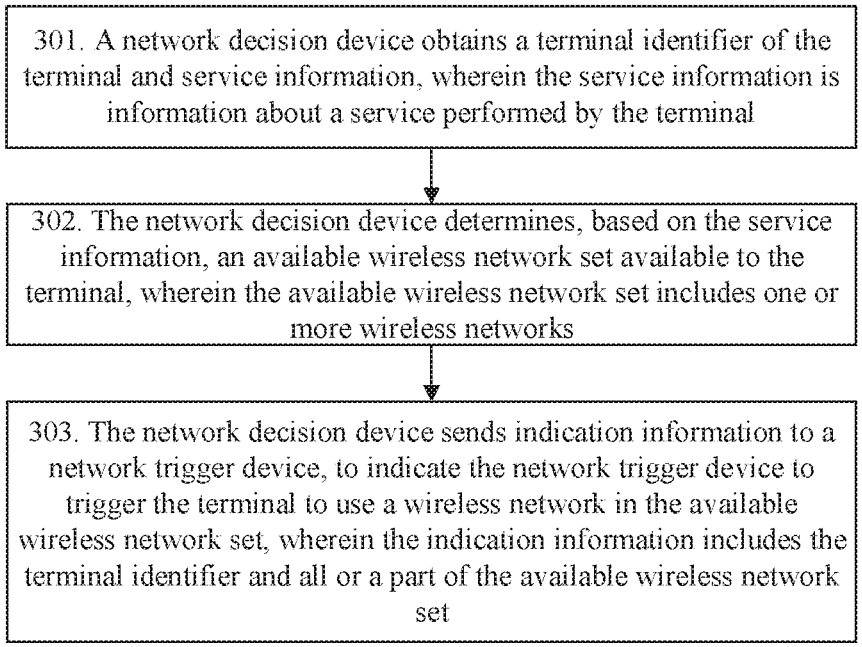
FIG. 3 is a flowchart of a method for controlling, by a network decision device, a terminal to use a wireless network according to an embodiment of this application.

FIG. 3 is a flowchart of a method for controlling, by a network decision device, a terminal to use a wireless network according to an embodiment of this application. The method includes the following steps:

Step 301: The network decision device obtains a terminal identifier of a terminal and service information, where the service information is information about a service performed by the terminal.

Optionally, the network decision device may obtain the terminal identifier and the service information from a message sent by the terminal to the network decision device, or may obtain the terminal identifier and the service information by analyzing a data packet of a service of the terminal.

Step 302: The network decision device determines, based on the service information, a wireless network available to the terminal, where the available wireless network set includes one or more wireless networks.

Optionally, the available wireless network set further includes priority information of the one or more available wireless networks, so that the network decision device or a network trigger device can further select a wireless network based on the priority information in a subsequent step.

Optionally, the network decision device may determine the available wireless network set by querying information about a correspondence between service information and a wireless network, where the information about the correspondence may be preset in the network decision device, or may be dynamically determined by the network decision device based on a network status.

Step 303: The network decision device sends indication information to the network trigger device, to indicate the network trigger device to trigger the terminal to use a wireless network in the available wireless network set, where the indication information includes the terminal identifier and all or a part of the available wireless network set.

Optionally, the network decision device may determine the network trigger device based on an attach status of the terminal, and send the indication information to the determined network trigger device.

Optionally, the network decision device may determine a target wireless network from the available wireless network set, determine or select the network trigger device based on the attach status of the terminal (including information about a wireless network to which the terminal has attached) and the target wireless network, and send the indication information to the determined or selected network trigger device, where the indication information includes the terminal identifier and the target wireless network. How the network decision device determines or selects the network trigger device based on the attach status of the terminal and the target wireless network is further described in subsequent embodiments of this application.

Optionally, the network decision device may determine that in the available wireless network set, a wireless network with a highest priority, a wireless network with an optimal quality of service (QoS) indicator, or a wireless network to which the terminal has attached is the target wireless network.

Optionally, the network decision device may transfer all the available wireless network set to the network trigger device, and the network trigger device selects or determines the target wireless network from the available wireless network set, and triggers the terminal to use the target wireless network.

Optionally, the network decision device may determine or select the network trigger device based on network connection information, and send the indication information to the determined network trigger device, where the indication information includes the terminal identifier and the available wireless network set.

According to Embodiment 3, the network decision device may collect the service information of the terminal, determine, based on a requirement of an operator, one or more wireless networks corresponding to the service, and transfer these wireless networks to the network trigger device, or select a target wireless network from these wireless networks and transfer the target wireless network to the network trigger device. In this way, the operator can determine a wireless network for the terminal, and the network trigger device triggers the terminal to use the determined wireless network.

Embodiment 4

Figure 4:
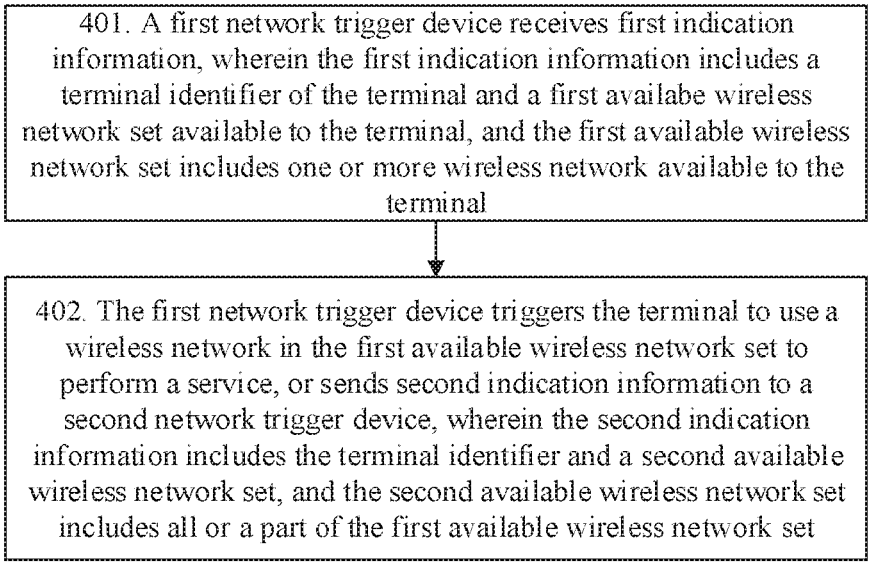
FIG. 4 is a flowchart of a method for controlling, by a first network trigger device, a terminal to use a wireless network according to an embodiment of this application.

FIG. 4 is a flowchart of a method for controlling, by a first network trigger device, a terminal to use a wireless network according to an embodiment of this application. The method includes the following steps:

Step 401: The first network trigger device receives first indication information, where the first indication information includes a terminal identifier of the terminal and a first available wireless network set available to the terminal, and the first available wireless network set includes one or more wireless networks available to the terminal.

Optionally, the first network trigger device may receive the first indication information from a network decision device, or may receive the first indication information from another network trigger device, for example, a third network trigger device.

Step 402: The first network trigger device triggers the terminal to use a wireless network in the first available wireless network set to perform a service, or sends second indication information to a second network trigger device, where the second indication information includes the terminal identifier and a second available wireless network set, and the second available wireless network set includes all or a part of the first available wireless network set.

Optionally, the first network trigger device triggers the terminal to use the wireless network in the first available wireless network set, so that the terminal sets up a radio bearer in the wireless network in the first available wireless network set to perform a service. Optionally, the first network trigger device may select a target wireless network from the first available wireless network set, and trigger the terminal to use the target wireless network. Optionally, the first network trigger device may select, from the first available wireless network set, a wireless network with a highest priority or a wireless network with an optimal QoS indicator as the target wireless network.

Optionally, the first network trigger device may alternatively send all or a part of the first available wireless network set to the second network trigger device, and the second network trigger device triggers the terminal to use the wireless network in the first available wireless network set. For example, the first network trigger device sends second indication information to the second network trigger device, where the second indication information includes the terminal identifier and a second available wireless network set, and the second available wireless network set includes all or a part of the first available wireless network set. The second network trigger device triggers the terminal to use a wireless network in the second available wireless network set. Optionally, the first network trigger device may select a target wireless network from the first available wireless network set, and send the target wireless network to the second network trigger device. Optionally, the first network trigger device may select, from the first available wireless network set, a wireless network with a highest priority, a wireless network with an optimal QoS indicator, or a wireless network to which the terminal has attached as the target wireless network.

According to Embodiment 4, the network trigger device may receive wireless networks available to the terminal that are determined by the network decision device, select a target wireless network from the available wireless network set, and trigger the terminal to use the target wireless network. In this way, the wireless network determined by an operator can be used by the terminal.

It should be uniformly noted that, in the embodiments of this application, "first", "second", or the like is added before "network trigger device", to distinguish between specific different network trigger devices. For example, when a policy control device 102 performs a function of the network trigger device, the policy control device 102 may send network use indication information to another network trigger device, for example, a device in a first PS core network 103. In this case, the first network trigger device may be used to correspond to the policy control device 102, and the second network trigger device may be used to correspond to the device in the first PS core network 103. "First", "second", or the like is added before "network use indication information" or "available wireless network set", to distinguish between "network use indication information" or "available wireless network set" at different phases of a transmission process, or to distinguish between "network use indication information" or "available wireless network set" sent/received by different sending/receiving devices in different embodiments. However, meanings or service meanings of the "network use indication information" or the "available wireless network set" do not change after "first", "second", or the like is added before the term. For this, details are not described in subsequent embodiments of this application.

Embodiment 5

Figure 5:
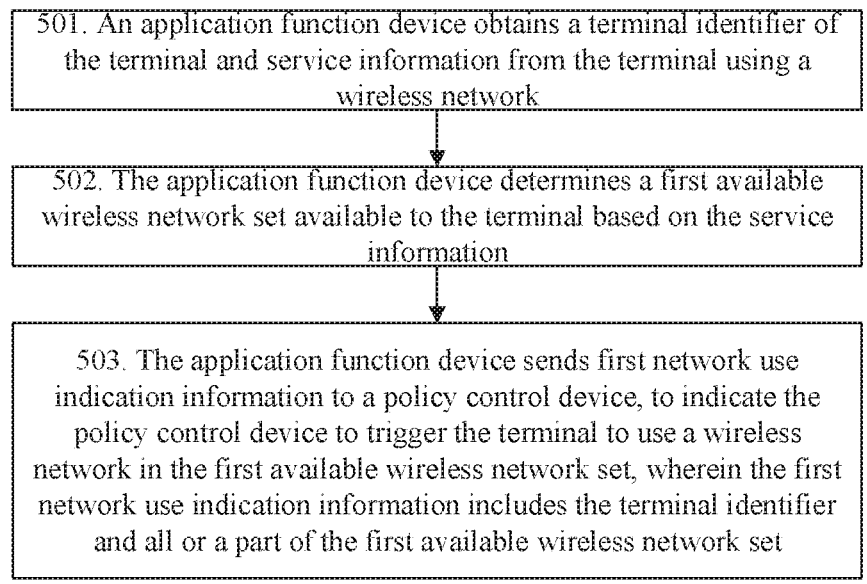
FIG. 5 is a flowchart of a method for controlling, by an application function device, a terminal to use a wireless network according to an embodiment of this application.

FIG. 5 is a flowchart of a method for controlling, by an application function device, a terminal to use a wireless network according to an embodiment of this application. The application function device performs functions of the foregoing network decision device, and a policy control device performs functions of the foregoing network trigger device. The method includes the following steps:

Step 501: The application function device obtains a terminal identifier of a terminal and service information from the terminal using a wireless network.

For example, the application function device receives a message, for example, an IMS (IP Multimedia Subsystem) message from the terminal using a wireless network, and obtains the terminal identifier and the service information from the message. For the "service information", refer to the foregoing embodiment.

Step 502: The application function device determines a first available wireless network set available to the terminal based on the service information.

Specifically, the application function device determines the first available wireless network set available to the terminal based on the service information, where the first available wireless network set includes one or more wireless networks.

Optionally, the application function device may determine the first available wireless network set based on a locally configured correspondence between service information and an available wireless network set. For example, a table of correspondences between service information and available wireless network set may be preset.

Step 503: The application function device sends first network use indication information to the policy control device, to indicate the policy control device to trigger the terminal to use a wireless network in the first available wireless network set, where the first network use indication information includes the terminal identifier and all or a part of the first available wireless network set.

Optionally, the application function device determines a target wireless network from the first available wireless network set, and includes the target wireless network in the first network use indication information, to indicate the policy control device to trigger the terminal to use the target wireless network.

Optionally, the application function device may receive failure information from the policy control device, where the failure information indicates that the terminal cannot use the wireless network in the first available wireless network set or the target wireless network. In this case, the application function device may further reselect a target wireless network, and send new network use indication information to the policy control device, where the new network use indication information includes the newly selected target wireless network.

The policy control device triggers, based on the first network use indication information, the terminal to use a corresponding wireless network. A specific method procedure is further described in the following embodiment.

According to Embodiment 5, an application layer (the application function device) in a communications network may determine a corresponding wireless network based on the service information of the terminal, and the policy control device triggers the terminal to use the wireless network. In this way, the terminal can use, in time, the wireless network required by a network side. This prevents a service from being affected because a wireless network used by the terminal does not meet the requirement.

The application function device may alternatively send the obtained terminal identifier and service information to the policy control device through the first network use indication information, and the policy control device determines a wireless network available to the terminal. In this case, the policy control device performs the functions of the network decision device in the foregoing embodiment. For a specific solution, refer to Embodiment 6.

Embodiment 6

Figure 6:
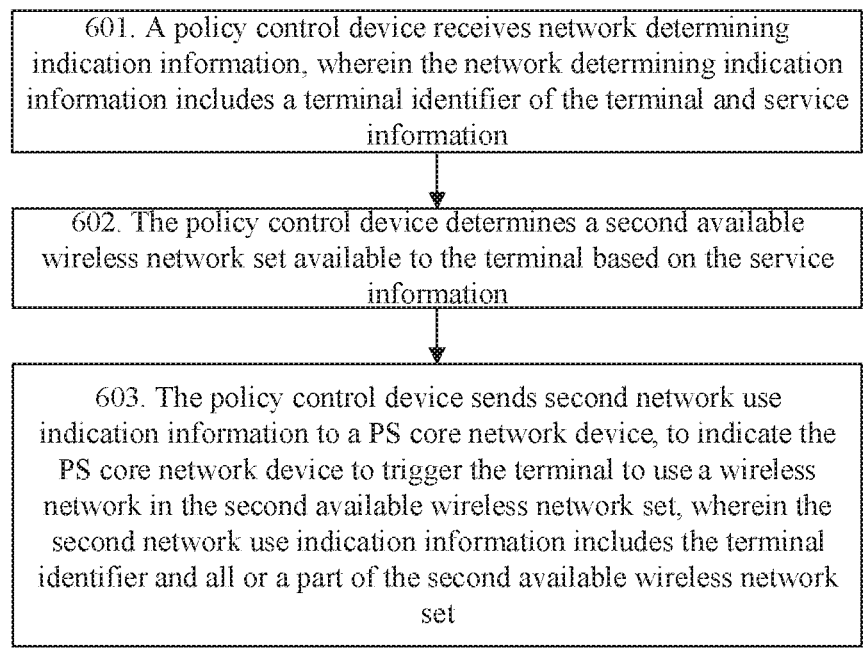
FIG. 6 is a flowchart of a method for controlling, by a policy control device, a terminal to use a wireless network according to an embodiment of this application.

FIG. 6 is a flowchart of a method for controlling, by a policy control device, a terminal to use a wireless network according to an embodiment of this application. The policy control device performs functions of the foregoing network decision device, that is, receives service information provided by an application function device or a packet detection device, and determines an available wireless network. Then, a PS core network device triggers the terminal to use the available wireless network. The method specifically includes the following steps:

Step 601: The policy control device receives network determining indication information, where the network determining indication information includes a terminal identifier and service information.

Optionally, the policy control device may receive a message from the application function device, and obtain the network determining indication information from the message, where the service information is obtained by the application function device from an IMS message sent by the terminal.

Optionally, the policy control device may alternatively receive a message from the packet detection device, and obtain the network determining indication information from the message, where the service information is detected by the packet detection device from a data packet of a service of the terminal.

Step 602: The policy control device determines a second available wireless network set available to the terminal based on the service information.

Specifically, after receiving and parsing the network determining indication information, the policy control device determines a second available wireless network set available to the terminal based on the service information, where the second available wireless network set includes one or more wireless networks.

Optionally, the policy control device may determine the second available wireless network set based on a locally configured correspondence between service information and an available wireless network set. For example, a table of correspondences between service information and available wireless network set may be preset, and the second available wireless network corresponding to the service information is obtained by querying the table of correspondences based on the service information.

Step 603: The policy control device sends second network use indication information to the PS core network device, to indicate the PS core network device to trigger the terminal to use a wireless network in the second available wireless network set, where the second network use indication information includes the terminal identifier and all or a part of the second available wireless network set.

Specifically, the policy control device may send the second network use indication information to a PS core network device corresponding to a wireless network currently used by the terminal, to indicate the PS core network device corresponding to the wireless network currently used by the terminal to trigger the terminal to use the wireless network in the second available wireless network set, where the second network use indication information includes the terminal identifier and all or the part of the second available wireless network set. For example, assuming that the wireless network currently used by the terminal is a first wireless network, and the PS core network corresponding to the first wireless network is a first PS core network, the policy control device may send the second network use indication information to the first PS core network device. Optionally, the policy control device may screen or filter the second available wireless network set (for example, select the best of the wireless networks based on a priority order or a QoS indicator order of the wireless networks), and then include a wireless network obtained through screening or filtering in the second network use indication information, so that the PS core network device corresponding to the wireless network currently used by the terminal triggers the terminal to use the wireless network obtained through screening or filtering. Optionally, the wireless network obtained through screening or filtering may include a single wireless network, or may include a plurality of wireless networks.

Specifically, the policy control device may also determine, from the available wireless network set, a wireless network to which the terminal has attached, and then send the second network use indication information to a PS core network device corresponding to the wireless network to which the terminal has attached, where the second network use indication information includes the terminal identifier and the attached wireless network. For example, assuming that the available wireless network set includes a second wireless network, and the terminal has attached to the second wireless network, the policy control device may send the second network use indication information to a second PS core network device, where the second network use indication information includes the terminal identifier and the wireless network (namely, the second wireless network) to which the terminal has attached.

It should be uniformly noted that, in the embodiments of this application, a "PS core network corresponding to a wireless network" is a PS core network that is connected to the wireless network and in which a terminal accessing the wireless network can set up a core network bearer. For example, a PS core network corresponding to a 5G wireless network is a 5G core network. Generally, one wireless network is connected to only one PS core network. However, a plurality of wireless networks may be connected to a same PS core network. For example, the 5G core network may be connected to both the 5G wireless network and a 4G wireless network, and a PS core network corresponding to each of the 5G wireless network and the 4G wireless network is the 5G core network. Therefore, the "PS core network device corresponding to the wireless network currently used by the terminal" is a PS core network that is connected to the wireless network currently used by the terminal and in which the terminal can set up a core network bearer. The "PS core network device corresponding to a target wireless network" is a PS core network that is connected to the target wireless network and in which the terminal can set up a core network bearer. Details are not described in subsequent embodiments of this application.

The policy control device may receive failure information from the foregoing PS core network device, where the failure information indicates that the terminal cannot use the wireless network in the available wireless network set, and the policy control device returns the failure information to the application function device or the packet detection device. After receiving the failure information, the policy control device may re-screen or filter the available wireless network set, and send new network use indication information to the PS core network device, where the new network use indication information includes a new wireless network obtained through screening or filtering.

According to Embodiment 6, an application layer (the policy control device) in a communications network may determine a corresponding wireless network based on the service information of the terminal, and the PS core network device triggers the terminal to use the wireless network. In this way, the terminal can use, in time, the wireless network required by a network side. This prevents a service from being affected because a wireless network used by the terminal does not meet the requirement.

The policy control device may also perform the functions of the network trigger device described in the foregoing embodiment. For details, reference may be made to Embodiment 7.

Embodiment 7

Figure 7:
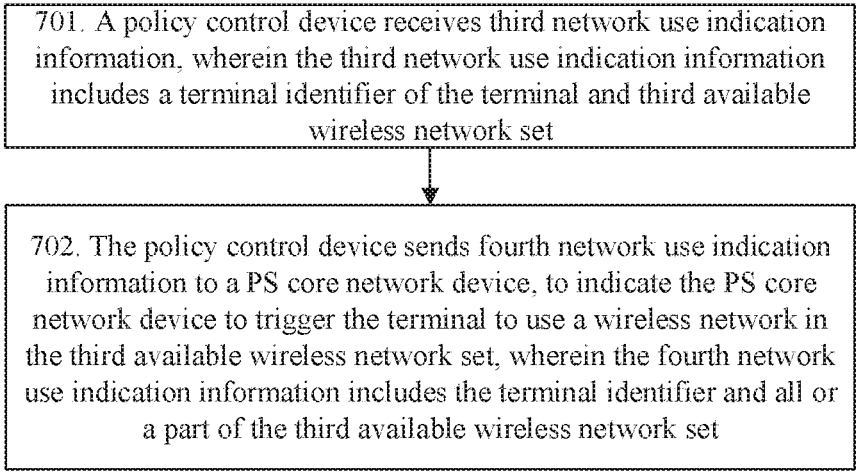
FIG. 7 is a flowchart of a method for controlling, by a policy control device, a terminal to use a wireless network according to an embodiment of this application.

FIG. 7 is a flowchart of a method for controlling, by a policy control device, a terminal to use a wireless network according to an embodiment of this application. The policy control device performs functions of the foregoing network trigger device, that is, receives an available wireless network sent by a network decision device. Then, a PS core network device triggers the terminal to use the available wireless network. The method specifically includes the following steps:

Step 701: The policy control device receives third network use indication information, where the third network use indication information includes a terminal identifier and a third available wireless network.

Specifically, the policy control device receives the third network use indication information, where the third network use indication information includes the terminal identifier of the terminal and the third available wireless network, the third available wireless network is a wireless network available to the terminal, and the third available wireless network includes one or more wireless networks.

Optionally, the policy control device may receive a message from an application function device, and obtain the third network use indication information from the message, where the third available wireless network is determined by the application function device based on service information of the terminal.

Optionally, the policy control device may receive a message from a packet detection device, and obtain the third network use indication information from the message, where the third available wireless network is determined by the packet detection device based on the service information of the terminal.

Step 702: The policy control device sends fourth network use indication information to the PS core network device, to indicate the PS core network device to trigger the terminal to use a wireless network in the third available wireless network set, where the fourth network use indication information includes the terminal identifier and all or a part of the third available wireless network set.

Specifically, similar to step 603, the policy control device may send the fourth network use indication information to a PS core network device corresponding to a wireless network currently used by the terminal. Optionally, the policy control device may screen or filter the third available wireless network set, and then include a wireless network obtained through screening or filtering in the fourth network use indication information.

Specifically, similar to step 603, the policy control device may also determine, from the third available wireless network set, a wireless network to which the terminal has attached, and then send the fourth network use indication information to a PS core network device corresponding to the wireless network to which the terminal has attached, where the fourth network use indication information includes the attached wireless network.

A process in which the PS core network device triggers the terminal to use the wireless network in the third available wireless network set is further described in subsequent embodiments.

Similar to the foregoing embodiment, the policy control device may receive failure information from the PS core network device, and perform an operation similar to the operation in the foregoing embodiment based on the failure information.

According to Embodiment 7, an application layer (the policy control device) in a communications network may send a wireless network determined by the application function device or the packet detection device to the PS core network device, so that the PS core network device triggers the terminal to use the wireless network. In this way, the terminal can use, in time, the wireless network required by a network side. This prevents a service from being affected because a wireless network used by the terminal does not meet the requirement.

Embodiment 8

Figure 8:
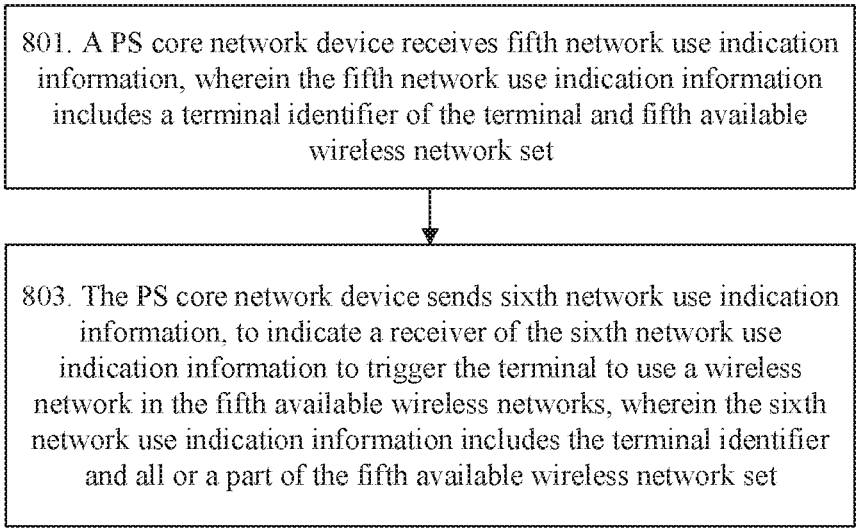
FIG. 8 is a flowchart of a method for controlling, by a PS core network device, a terminal to use a wireless network according to an embodiment of this application.

FIG. 8 is a flowchart of a method for controlling, by a PS core network device, a terminal to use a wireless network according to an embodiment of this application. The PS core network is a PS core network corresponding to a wireless network currently used by the terminal. The PS core network device performs functions of the foregoing network trigger device, that is, receives an available wireless network sent by a network decision device. Then, a radio access device corresponding to the wireless network currently used by the terminal, or a radio access device corresponding to a wireless network to which the terminal has currently attached, or a PS core network device corresponding to a wireless network to which the terminal has attached triggers the terminal to use the available wireless network. The method specifically includes the following steps:

Step 801: The PS core network device receives fifth network use indication information, where the fifth network use indication information includes a terminal identifier of the terminal and a fifth available wireless network set.

Optionally, similar to the foregoing embodiment, the PS core network device may receive the fifth network use indication information from a policy control device or a packet detection device.

Step 802: The PS core network device sends sixth network use indication information, to indicate a receiver of the sixth network use indication information to trigger the terminal to use a wireless network in the fifth available wireless network set, where the sixth network use indication information includes the terminal identifier and all or a part of the fifth available wireless network set.

Specifically, the PS core network device may send the sixth network use indication information to the radio access device corresponding to the wireless network currently used by the terminal. Optionally, similar to the foregoing embodiment, the PS core network device may screen or filter the available wireless network set included in the fifth network use indication information, and then include an available wireless network obtained through screening or filtering in the sixth network use indication information.

Specifically, the PS core network device may also determine, from the fifth available wireless network set, the wireless network to which the terminal has attached, and then send the sixth network use indication information to the PS core network device corresponding to the wireless network to which the terminal has attached, or the radio access device (for example, a base station) corresponding to the wireless network to which the terminal has attached, or an adaptation device (namely, a device that connects a Wi-Fi wireless network to the PS core network, for example, an ePDG device that connects the Wi-Fi wireless network to a 4G PS core network or an N31WF device that connects the Wi-Fi wireless network to a 5G PS core network) corresponding to the wireless network to which the terminal has attached, where the sixth network use indication information includes the terminal identifier and the attached wireless network (used as a target wireless network). For example, assuming that the fifth available wireless network set includes a second wireless network, the terminal has attached to the second wireless network, and a PS core network device corresponding to the second wireless network is a second PS core network device, the PS core network device may send the sixth network use indication information to the second PS core network device, where the sixth network use indication information includes the second wireless network.

Optionally, similar to the foregoing embodiment, the PS core network device receives failure information from the receiver of the sixth network use indication information, and performs an operation similar to the operation in the foregoing embodiment based on the failure information.

It should be uniformly noted that the PS core network device in this embodiment of this application may be a single device, or may be a combination of devices, for example, a 5G PS core network device may be a combination of devices such as an SMF and an AMF. The fifth network use indication information and the sixth network use indication information may be transferred between the plurality of devices.

According to Embodiment 8, a PS core network layer (the PS core network device) may transfer an available wireless network determined by an application layer (the policy control device or the packet detection device) to a radio access device or another PS core network, so that the radio access device or the another PS core network triggers the terminal to use the wireless network. In this way, the terminal can use, in time, the wireless network required by a network side. This prevents a service from being affected because a wireless network used by the terminal does not meet the requirement.

Embodiment 9

Figure 9:
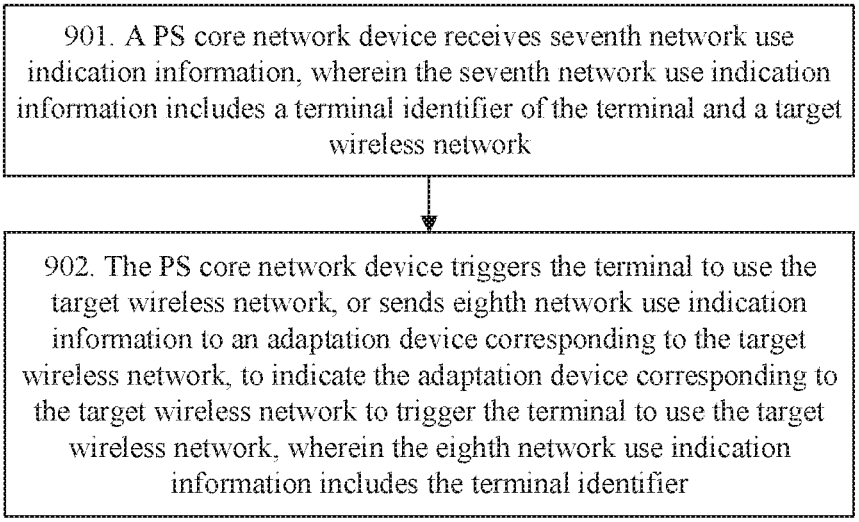
FIG. 9 is a flowchart of a method for controlling, by a PS core network device, a terminal to use a wireless network according to an embodiment of this application.

FIG. 9 is a flowchart of a method for controlling, by a PS core network device, a terminal to use a wireless network according to an embodiment of this application. The PS core network is a PS core network corresponding to a wireless network to which the terminal has attached but that is not used by the terminal yet (that is, no radio bearer is set up). The PS core network device performs functions of the foregoing network trigger device, that is, receives a target wireless network determined by a network decision device, and then triggers the terminal to use the target wireless network. Alternatively, an adaptation device of the target wireless network triggers the terminal to use the target wireless network. The method specifically includes the following steps:

Step 901: The PS core network device receives seventh network use indication information, where the seventh network use indication information includes a terminal identifier of the terminal and the target wireless network.

Optionally, the PS core network device receives the seventh network use indication information from a policy control device, a radio access device corresponding to the wireless network, or a packet detection device.

Step 902: The PS core network device triggers the terminal to use the target wireless network, or sends eighth network use indication information to the adaptation device corresponding to the target wireless network, to indicate the adaptation device corresponding to the target wireless network to trigger the terminal to use the target wireless network, where the eighth network use indication information includes the terminal identifier.

Specifically, after receiving and parsing the seventh network use indication information, the PS core network device triggers the terminal to use the target wireless network. For example, if the PS core network device determines that the terminal has attached to the target wireless network but has not set up a radio bearer in the target wireless network, the PS core network device triggers, through a message, the terminal to set up a radio bearer in the target wireless network to perform a service.

Specifically, when the target wireless network is a Wi-Fi wireless network, the PS core network device may send the eighth network use indication information to the adaptation device (for example, an ePDG device or an N3IWF device) corresponding to the target wireless network, to indicate the adaptation device to trigger the terminal to use the target wireless network.

Optionally, similar to the foregoing embodiment, the PS core network device receives failure information from a receiver of the eighth network use indication information, and performs an operation similar to the operation in the foregoing 3?embodiment based on the failure information.

Similar to step 802, the PS core network device may be a single device, or may be a combination of devices.

According to Embodiment 9, a PS core network layer (the PS core network device) may trigger the terminal to use a target wireless network determined by the policy control device or the packet detection device, or send the target wireless network to the adaptation device corresponding to the target wireless network, so that the adaptation device corresponding to the target wireless network triggers the terminal to use the target wireless network. In this way, the terminal can use, in time, the wireless network required by a network side. This prevents a service from being affected because a wireless network used by the terminal does not meet the requirement.

Embodiment 10

Figure 10:
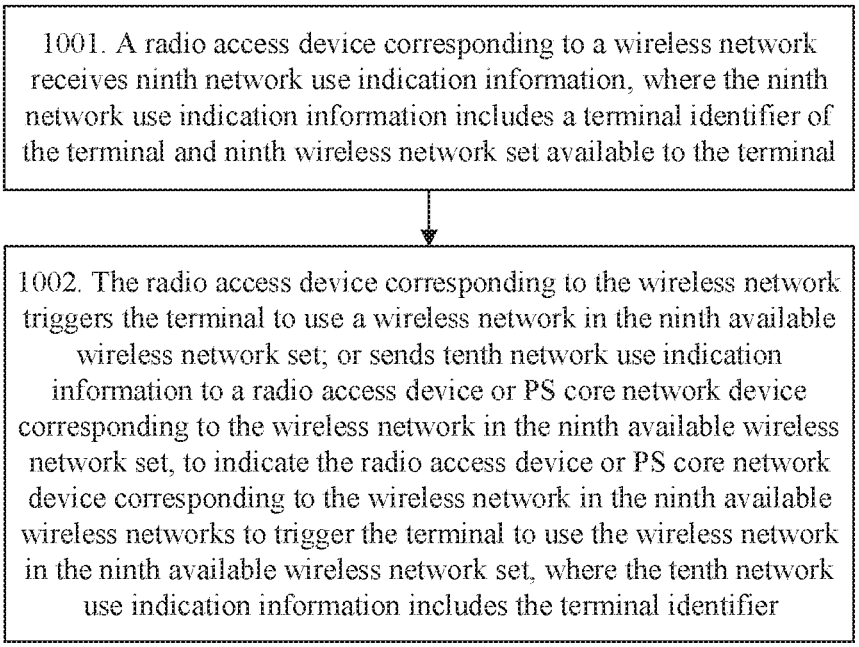
FIG. 10 is a flowchart of a method for triggering, by a radio access device corresponding to a wireless network, a terminal to use the wireless network according to an embodiment of this application.

FIG. 10 is a flowchart of a method for triggering, by a radio access device corresponding to a wireless network, a terminal to use the wireless network according to an embodiment of this application. The wireless network is a wireless network currently used by the terminal. The radio access device corresponding to the wireless network performs functions of the foregoing network trigger device, that is, selects a target wireless network from an available wireless network set sent by a network decision device, and triggers the terminal to use the target wireless network. Alternatively, a radio access device corresponding to the target wireless network triggers the terminal to use the target wireless network. The method specifically includes the following steps:

Step 1001: The radio access device corresponding to the wireless network receives ninth network use indication information, where the ninth network use indication information includes a terminal identifier of the terminal and ninth wireless networks available to the terminal.

Optionally, the radio access device corresponding to the wireless network may receive the ninth network use indication information from a PS core network device, where the PS core network device may be a PS core network device corresponding to the wireless network.

Optionally, the radio access device corresponding to the wireless network may receive the ninth network use indication information from a packet detection device, where the available wireless network included in the ninth network use indication information is determined by the packet detection device.

For example, assuming that the first wireless network 105 in FIG. 1 or FIG. 2 is a wireless network currently used by the terminal 107, a radio access device corresponding to the first wireless network 105 may receive the ninth network use indication information from the packet detection device 201 or a device in the first PS core network 103.

Step 1002: The radio access device corresponding to the wireless network triggers the terminal to use a wireless network in the ninth available wireless network set. Alternatively, the radio access device corresponding to the wireless network sends tenth network use indication information to a radio access device or PS core network device corresponding to a wireless network in the ninth available wireless network set, to indicate the radio access device or PS core network device corresponding to the wireless network in the ninth available wireless network set to trigger the terminal to use the wireless network in the ninth available wireless network set, where the tenth network use indication information includes the terminal identifier.

Specifically, the radio access device corresponding to the wireless network may select a wireless network from the available wireless network set (for example, select a wireless network with a highest priority or a wireless network with an optimal QoS parameter in the available wireless network set as the target wireless network). If it is determined that the terminal has not attached to the selected wireless network, the radio access device corresponding to the wireless network triggers handover of the terminal to the selected wireless network, so that the terminal sets up a radio bearer in the selected wireless network to perform a service. If it is determined that the terminal has attached to the selected wireless network, the radio access device corresponding to the wireless network sends the tenth network use indication information to a radio access device or PS core network device corresponding to the selected wireless network, to indicate the radio access device or PS core network device corresponding to the selected wireless network to trigger the terminal to set up a radio bearer in the selected wireless network, so as to perform a service.

The example in step 1001 is further described. Assuming that there are three available wireless networks, the radio access device corresponding to the first wireless network 105 may trigger the terminal 107 to use the three wireless networks one by one. Assuming that one of the three wireless networks is a second wireless network 106, and the terminal 107 has attached to the second wireless network 106, the radio access device corresponding to the first wireless network 105 may send the tenth network use indication information to a radio access device corresponding to a second PS core network 104 or a radio access device corresponding to the second wireless network 106.

Optionally, if the radio access device corresponding to the wireless network determines that the terminal cannot use the selected wireless network, the radio access device corresponding to the wireless network reselects a wireless network from the available wireless network set, and re-triggers the terminal to set up a radio bearer in the reselected wireless network. Alternatively, the radio access device corresponding to the wireless network returns failure information to the PS core network device or the packet detection device that sends the tenth network use indication information, so that the PS core network device or the packet detection device sends new tenth network use indication information. In this way, the radio access device corresponding to the wireless network can re-trigger the terminal to use a wireless network in the available wireless network set included in the new tenth use network indication information.

According to Embodiment 10, a radio network layer (the radio access device) can select a target wireless network from the available wireless network set transferred by a core network layer (the PS core network device) or the packet detection device, and trigger the terminal to use the target wireless network. In this way, the terminal can use, in time, the wireless network required by a network side. This prevents a service from being affected because a wireless network used by the terminal does not meet the requirement.

Embodiment 11

Figure 11:
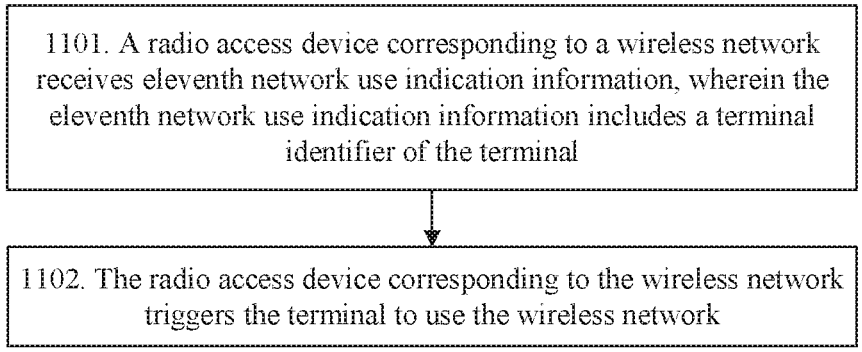
FIG. 11 is a flowchart of a method for triggering, by a radio access device corresponding to a wireless network, a terminal to use the wireless network according to an embodiment of this application.

FIG. 11 is a flowchart of a method for triggering, by a radio access device corresponding to a wireless network, a terminal to use the wireless network according to an embodiment of this application. The wireless network is a wireless network to which the terminal has attached but that is not used by the terminal yet (a radio bearer is not set up). The radio access device corresponding to the wireless network performs functions of the foregoing network trigger device, that is, triggers, based on network use indication information sent by a network decision device, the terminal to use the wireless network to which the terminal has attached. The method specifically includes the following steps:

Step 1101: The radio access device corresponding to the wireless network receives eleventh network use indication information, where the eleventh network use indication information includes a terminal identifier of the terminal.

Specifically, the radio access device corresponding to the wireless network receives the eleventh network use indication information, where the eleventh network use indication information includes the terminal identifier of the terminal, and the eleventh network use indication information is used to indicate the radio access device corresponding to the wireless network to trigger the terminal to use the wireless network (that is, use the wireless network in which the radio access device is located).

Optionally, the eleventh network use indication information may further include the wireless network.

Optionally, the radio access device corresponding to the wireless network receives the eleventh network use indication information from a PS core network device, where the PS core network device may be a device in a PS core network corresponding to the wireless network, or may be a device in a PS core network corresponding to a wireless network currently used by the terminal.

Optionally, the radio access device corresponding to the wireless network receives the eleventh network use indication information from a radio access device corresponding to the wireless network currently used by the terminal.

Optionally, the radio access device corresponding to the wireless network receives the eleventh network use indication information from a packet detection device.

For example, assuming that the second wireless network 106 in FIG. 1 or FIG. 2 is a wireless network to which the terminal has attached, a radio access device corresponding to the second wireless network may receive the eleventh network use indication information from a device in the first PS core network 103, or from a device in the second PS core network device 104, or from a radio access device corresponding to the first wireless network 105, or from the packet detection device 201.

Step 1102: The radio access device corresponding to the wireless network triggers the terminal to use the wireless network.

After receiving and parsing the eleventh network use indication information, the radio access device corresponding to the wireless network triggers the terminal to use the wireless network.

Optionally, if the radio access device corresponding to the wireless network determines that the terminal cannot use the wireless network, the radio access device corresponding to the wireless network returns failure information to the PS core network device, the radio access device, or the packet detection device that sends the eleventh network use indication information, so that the PS core network device, the radio access device, or the packet detection device that sends the eleventh network use indication information triggers the terminal to use another wireless network.

According to Embodiment 11, a radio network layer (the radio access device) can trigger the terminal to use a wireless network specified by a core network layer (the PS core network device) or the packet detection device. In this way, the terminal can use, in time, the wireless network required by a network side. This prevents a service from being affected because a wireless network used by the terminal does not meet the requirement.

Embodiment 12

Figure 12A:
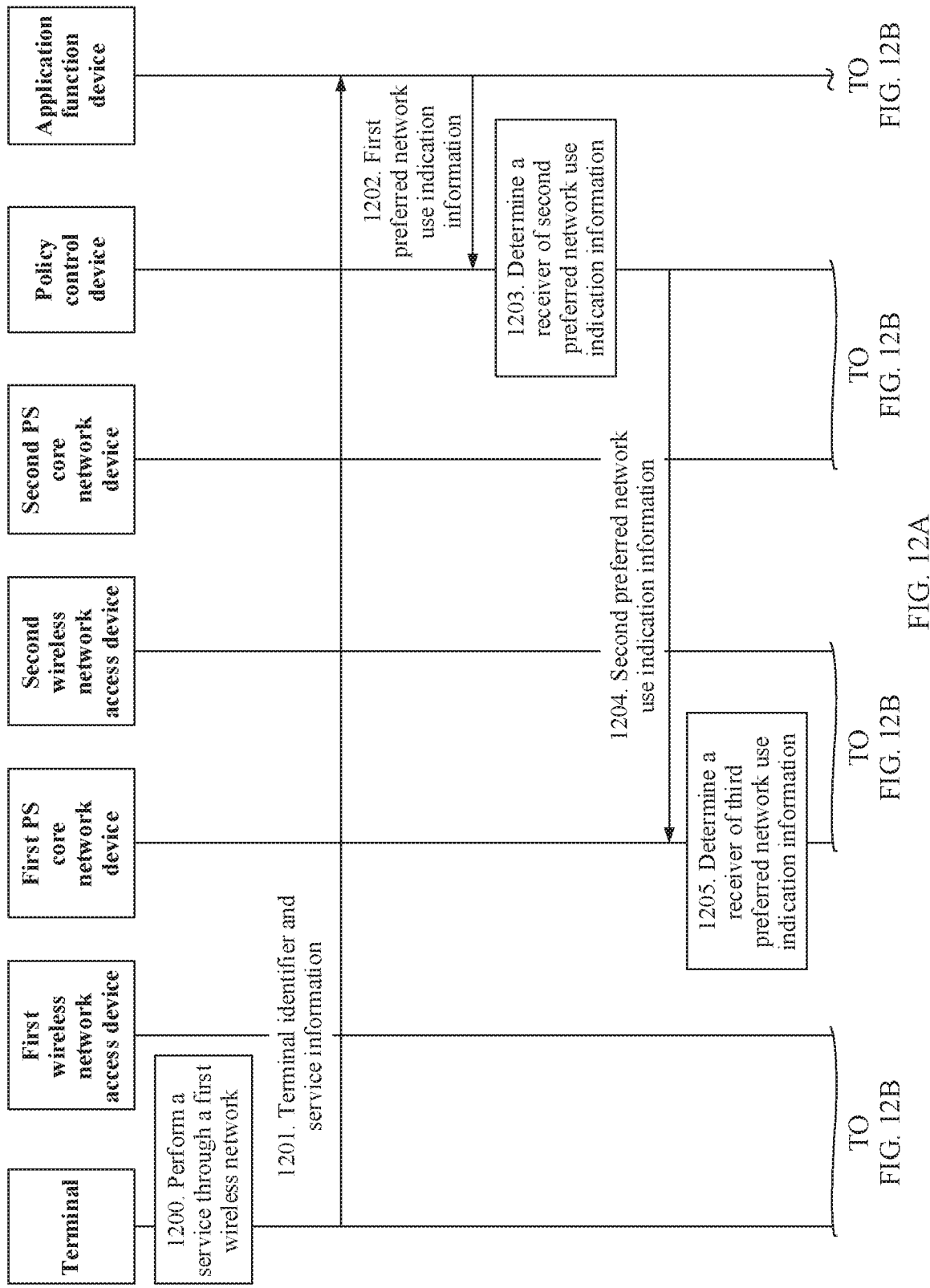
FIG. 12A and FIG. 12B are a flowchart of a method for controlling a terminal to use a preferred wireless network according to an embodiment of this application.
Figure 12B:
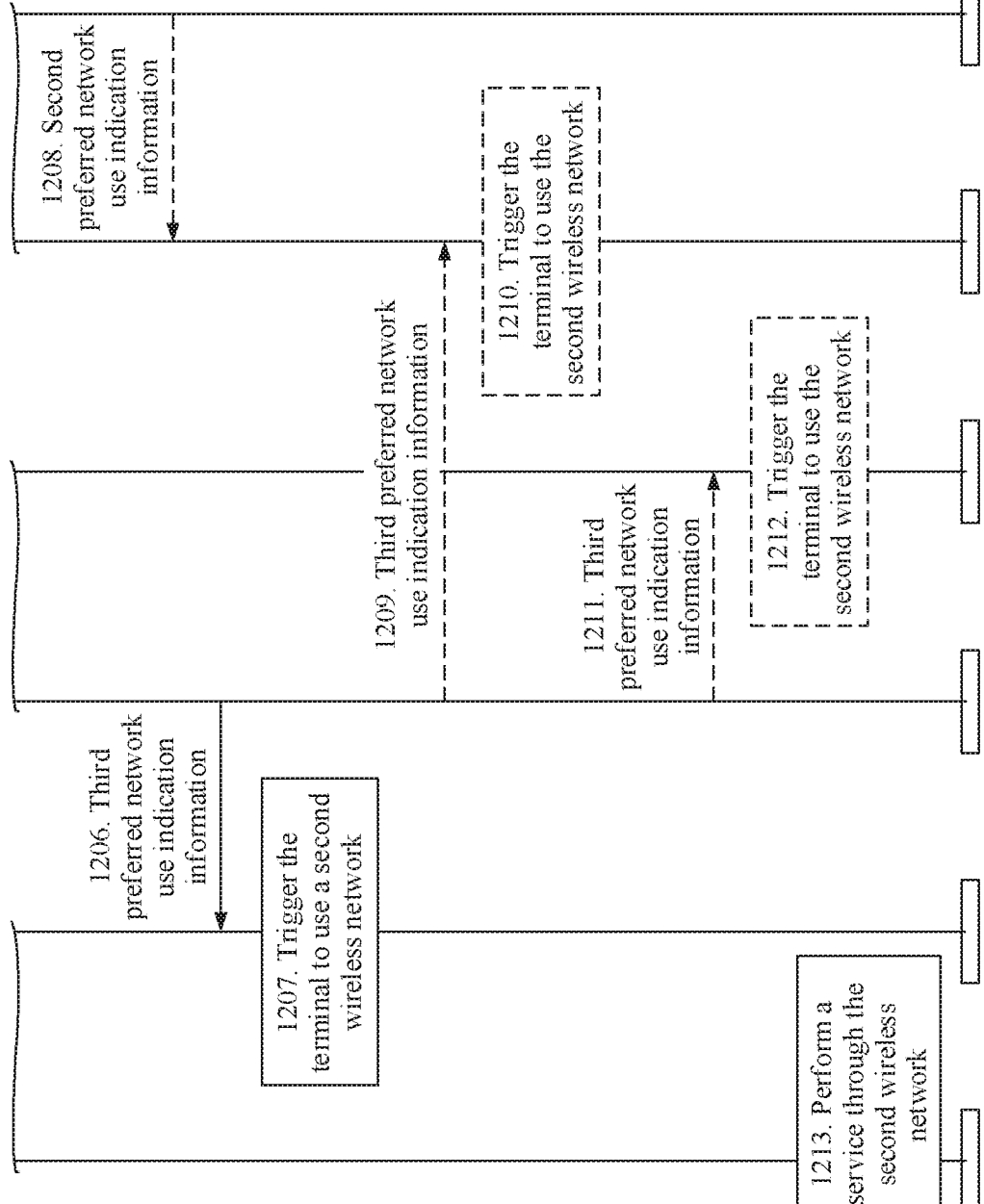

FIG. 12A and FIG. 12B are a flowchart of a method, on the basis of the architecture shown in FIG. 1, for controlling a terminal to use a preferred wireless network according to an embodiment of this application. When the terminal uses the preferred wireless network, an optimal effect can be achieved, for example, network resources of an operator are fully used, or user experience is the best. A specific optimal effect that can be achieved depends on a policy of the operator, and is not limited in this application. An application function device or a policy control device performs functions of the foregoing network decision device, and a first PS core network device, a second PS core network device, a first wireless network access device, or a second wireless network access device performs functions of the foregoing network trigger device. Assuming that the terminal currently performs a service through a first wireless network, and one of preferred wireless networks corresponding to the service performed by the terminal is a second wireless network, an application layer triggers the terminal to use the second wireless network. The method specifically includes the following steps:

Step 1200: The terminal performs a service through the first wireless network.

The terminal attaches to the first wireless network, and establishes a wireless channel or sets up a radio bearer in the first wireless network, to perform a service.

Step 1201: The terminal sends a terminal identifier and service information to the application function device.

The terminal may send a service request message to the application function device, where the service request message includes the terminal identifier and the service information, and the service information may include a service type and/or a device type of the terminal.

Step 1202: The application function device sends first preferred network use indication information to the policy control device.

After receiving and parsing the terminal identifier and the service information, the application function device sends the first preferred network use indication information to the policy control device, to indicate the policy control device to trigger the terminal to use a preferred wireless network corresponding to the service information, where the first preferred network use indication information includes the terminal identifier.

Optionally, the application function device may include the service information in the first preferred network use indication information, and the policy control device determines a preferred wireless network based on the service information.

Optionally, the application function device may determine a list of preferred wireless networks for the terminal based on the service information, and include the list of preferred wireless networks in the first preferred network use indication information. For example, assuming that the service information includes the device type and/or the service type, the application function device may determine the list of preferred wireless networks based on the device type and/or the service type. Optionally, the operator may preset, on a network side, tables of correspondences between device types and/or service types and preferred wireless networks, as shown in Tables 1 to 3, so that the application function device or another network device may determine, based on the tables of correspondences, a preferred wireless network corresponding to a device type and/or a service type.

TABLE 1

Table of correspondences between service types and preferred wireless networks

| Service type | Preferred wireless network | Description |
|---|---|---|
| Voice call | 4G wireless network > 3G wireless network > 5G wireless network | For a voice service, a 4G wireless network is preferred, followed sequentially by a 3G wireless network and a 5G wireless network. |
| Video call | Wi-Fi wireless network > 5G wireless network | For a video call service, a Wi-Fi wireless network is preferable to a 5G wireless network. |
| Facebook/Twitter | 4G wireless network > 3G wireless network | For a Facebook/Twitter service, a 4G wireless network is preferable to a 3G wireless network. |
| MCPTT service | 5G wireless network > 4G wireless network | For a mission-critical push-to-talk (Mission-Critical Push-To-Talk, MCPTT) service, a 5G wireless network is preferable to a 4G wireless network. |

TABLE 2

Table of correspondences between device types and preferred wireless networks

| Device type | Preferred wireless network | Description |
|---|---|---|
| Mobile phone terminal | 5G wireless network > 4G wireless network | For a mobile phone terminal, a 5G wireless network is preferable to a 4G wireless network. |

TABLE 2-continued

Table of correspondences between device types and preferred wireless networks

| Device type | Preferred wireless network | Description |
| --- | --- | --- |
| Internet of things terminal | 4G wireless network > 3G wireless network | For an internet of things terminal, a 4G wireless network is preferable to a 3G wireless network. |

TABLE 3

Table of correspondences between service types, device types, and preferred wireless networks

| Device type | Service type | Preferred wireless network | Description |
| --- | --- | --- | --- |
| Internet of things terminal | Voice service | 4G wireless network > 3G wireless network | When an internet of things terminal performs a voice service, a 4G wireless network is preferable to a 3G wireless network. |
| MCPTT terminal | Video service | 5G wireless network > 4G wireless network | When an MCPTT terminal performs a video service, a 5G wireless network is preferable to a 4G wireless network. |
| Mobile phone terminal | Video service | Wi-Fi wireless network > 5G wireless network > 4G wireless network | When a mobile phone terminal performs a video service, a Wi-Fi wireless network is preferred, followed sequentially by a 5G wireless network and a 4G wireless network. |

Optionally, the application function device may determine a target wireless network from the preferred wireless networks, and include the target wireless network in the first preferred network use indication information. For example, a wireless network with a highest priority in the preferred wireless networks corresponding to the device type and/or the service type may be used as the target wireless network. In this embodiment, it is assumed that the target wireless network is the second wireless network.

Optionally, before sending the first preferred network use indication information to the policy control device, the application function device further obtains information about a wireless network currently used by the terminal, and determines that the wireless network currently used by the terminal is not a preferred wireless network or the target wireless network (if the wireless network currently used by the terminal is already a preferred wireless network, the application function device does not need to send the first preferred network use indication information to the policy control device).

Step 1203: The policy control device determines a receiver of second preferred network use indication information.

The policy control device constructs the second preferred network use indication information after receiving and parsing the first preferred network use indication information, where the second preferred network use indication information includes the terminal identifier.

If the first preferred network use indication information includes the service information (for example, the device type and/or the service type), the policy control device adds a list of preferred wireless networks determined based on Tables 1 to 3 to the second preferred network use indication information.

If the first preferred network use indication information already includes the list of preferred wireless networks, the policy control device may include the list of preferred wireless networks in the second preferred network use indication information. Alternatively, the list of preferred wireless networks may be screened/filtered, for example, only a wireless network with a better QoS indicator is reserved, and then a wireless network obtained through screening/filtering is included in the second preferred network use indication information. Alternatively, a target wireless network (for example, the second wireless network) may be selected from the list of preferred wireless networks, and then the target wireless network is included in the second preferred network use indication information.

If the first preferred network use indication information includes a target wireless network, the policy control device includes the target wireless network in the second preferred network use indication information or directly sends the target wireless network as the second preferred network use indication information. In this example, it is assumed that the target wireless network is the second wireless network.

The policy control device may determine the receiver of the second preferred network use indication information based on the constructed second preferred network use indication information, which is specifically as follows:

When the second preferred network use indication information includes a plurality of preferred wireless networks, the policy control device determines that a PS core network device (which is the first PS core network device in this example) corresponding to the wireless network currently used by the terminal is the receiver of the second preferred network use indication information.

Alternatively, when the second preferred network use indication information includes the target wireless network (namely, the second wireless network), the policy control device selects, based on different attach statuses of the terminal, different PS core network devices as receivers of the second preferred network use indication information. Examples are used in the following:

(1) The policy control device determines that the terminal has attached to the target wireless network (namely, the second wireless network. In this case, the terminal is usually a dual-attach capable terminal, where dual attachment refers to attachment to two wireless networks at the same time), and determines a PS core network device (namely, the second PS core network device) corresponding to the target wireless network as the receiver of the second preferred network use indication information. The process of the method goes to step 1208.

(2) The policy control device determines that the terminal has not attached to the target wireless network (namely, the second wireless network. In this case, the terminal is usually a single-attach capable terminal, where single attachment refers to attachment to only one wireless network at a time), and determines that the PS core network device (namely, the first PS core network device) corresponding to the wireless network used by the terminal is the receiver of the second preferred network use indication information. The process of the method goes to step 1204.

In this way, the policy control device may send the second preferred network use indication information to a corresponding receiver.

It should be noted that, during a process in which the terminal sets up a radio bearer, correspondences between the terminal identifier and addresses or identifiers of the PS core network devices corresponding to the wireless network used by the terminal is registered in the policy control device. In this way, the policy control device may determine, based on the correspondences, the address or the identifier of the PS core network device corresponding to the wireless network used by the terminal.

Optionally, before sending the second preferred network use indication information to the receiver, the policy control device further obtains the information about the wireless network currently used by the terminal, and determines that the wireless network currently used by the terminal is not a preferred wireless network or the target wireless network (if the wireless network currently used by the terminal is a preferred wireless network or the target wireless network, the policy control device does not need to send the second preferred network use indication information to the receiver).

Step 1204: The policy control device sends the second preferred network use indication information to the first PS core network device.

The policy control device sends the second preferred network use indication information to the first PS core network device, where the second preferred network use indication information includes the terminal identifier and the target wireless network or the list of preferred wireless networks.

Step 1205: The first PS core network device determines a receiver of third preferred network use indication information.

The first PS core network device constructs the third network use indication information after receiving and parsing the second preferred network use indication information, where the third network use indication information includes the terminal identifier.

If the second preferred network use indication information already includes the list of preferred wireless networks, the first PS core network device may include the list of preferred wireless networks in the third preferred network use indication information. Alternatively, the list of preferred wireless networks may be screened/filtered, for example, only a wireless network with a better QoS indicator is reserved, and then a wireless network obtained through screening/filtering is included in the third preferred network use indication information. Alternatively, a target wireless network may be selected from the list of preferred wireless networks (for example, a wireless network with a highest priority or a wireless network with an optimal QoS indicator is selected, and in this example, it is assumed that the target wireless network is the second wireless network), and then the target wireless network is included in the third preferred network use indication information.

If the second preferred network use indication information includes the target wireless network, the first PS core network device may include the target wireless network in the third preferred network use indication information.

The first PS core network device may select different entities as receivers of the third network use indication information, which is specifically as follows:

If the third preferred network use indication information includes the target wireless network, the first PS core network device determines, based on a current wireless network attach status of the terminal, the receiver of the third network use indication information, which is specifically as follows:

(1) If the first PS core network device determines that the terminal has attached to the target wireless network (namely, the second wireless network), and that the PS core network (namely, the second PS core network) corresponding to the target wireless network is different from the PS core network (namely, the first PS core network) corresponding to the wireless network used by the terminal, the first PS core network device determines that the PS core network device corresponding to the target wireless network is the receiver of the third network use indication information. The process of the method goes to step 1209.

(2) If the first PS core network device determines that the terminal has attached to the target wireless network (namely, the second wireless network), and that the PS core network (namely, the second PS core network) corresponding to the target wireless network is the same as the PS core network (namely, the first PS core network) corresponding to the wireless network used by the terminal, that is, the target wireless network and the wireless network currently used by the terminal are connected to the same PS core network, the first PS core network device determines that a radio access device corresponding to the target wireless network is the receiver of the third network use indication information. The process of the method goes to step 1211.

(3) If the first PS core network device determines that the terminal has not attached to the target wireless network, the first PS core network device determines that a radio access device (namely, the first wireless network access device) corresponding to the wireless network used by the terminal is the receiver of the third network use indication information. The process of the method goes to step 1206.

In this way, the first PS core network device may send the third network use indication information to a corresponding receiver.

Step 1206: The first PS core network device sends the third preferred network use indication information to the first wireless network access device.

The first PS core network device sends the third network use indication information to the first wireless network access device, where the third preferred network use indication information includes the terminal identifier and the list of preferred wireless networks or the target wireless network.

Step 1207: The first wireless network access device triggers the terminal to use the second wireless network.

After receiving the third preferred network use indication information, the first wireless network access device triggers the terminal to use the wireless network included in the third preferred network use indication information, which is specifically as follows:

(1) The third preferred network use indication information includes the target wireless network (namely, the second wireless network), and the first wireless network access device triggers the terminal to use the target wireless network.

Optionally, if the first wireless network access device determines that the terminal cannot use the target wireless network, the first wireless network access device returns failure information to the first PS core network device, where the failure information indicates that the terminal cannot use the target wireless network.

(2) The third preferred network use indication information includes the list of preferred wireless networks. The first wireless network access device determines a target wireless network from the list of preferred wireless networks, and triggers the terminal to use the determined target wireless network.

Optionally, if the first wireless network access device determines that the terminal cannot use the target wireless network, the first wireless network access device determines another target wireless network from the list of preferred wireless networks, and triggers the terminal to use the another target wireless network. The rest may be deduced by analogy, until the list of preferred wireless networks is traversed. If the terminal can use one of the wireless networks, the first wireless network access device returns success information to the first PS core network device, where the success information indicates that the terminal successfully uses the wireless network in the list of preferred wireless networks. If the terminal cannot use any preferred wireless network, the first wireless network access device returns failure information to the first PS core network device, where the failure information indicates that the terminal cannot use the wireless network in the list of preferred wireless networks.

Until now, the terminal may set up a radio bearer in the wireless network specified by the network side, and continue to perform the service.

Step 1208: The policy control device sends the second preferred network use indication information to the second PS core network device.

The policy control device sends the second preferred network use indication information to the second PS core network device, to indicate the second PS core network device to trigger the terminal to use the target wireless network, where the second preferred network use indication information includes the terminal identifier and the target wireless network. The process of the method goes to step 1210.

Step 1209: The first PS core network device sends the third preferred network use indication information to the second PS core network device.

The first PS core network device sends the third preferred network use indication information to the second PS core network device, to indicate the second PS core network device to trigger the terminal to use the target wireless network, where the third preferred network use indication information includes the terminal identifier and the target wireless network. The process of the method goes to step 1210.

Step 1210: The second PS core network device triggers the terminal to use the second wireless network.

The second PS core network device receives the second preferred network use indication information or the third preferred network use indication information, and sends a message to the radio access device corresponding to the target wireless network based on the terminal identifier and the target wireless network (namely, the second wireless network) in the second preferred network use indication information or the third preferred network use indication information, to trigger the terminal to set up a bearer in the target wireless network.

Until now, the terminal may set up a bearer in the wireless network specified by the network side, and continue to perform the service.

Step 1211: The first PS core network device sends the third preferred network use indication information to the second wireless network access device.

The first PS core network device sends the third preferred network use indication information to the second wireless network access device, to indicate the second wireless network access device to trigger the terminal to use the target wireless network (namely, the second wireless network), where the third preferred network use indication information includes the terminal identifier and the target wireless network.

Step 1212: The second wireless network access device triggers the terminal to use the second wireless network.

The second wireless network access device receives and parses the second preferred network use indication information or the third preferred network use indication information, and triggers the terminal to set up a radio bearer in the target wireless network (the second wireless network).

Until now, the terminal may set up a bearer in the wireless network specified by the network side, and continue to perform the service.

According to Embodiment 12, the application function device or the policy control device may determine a preferred wireless network for the terminal based on a service requirement of the operator, and select a corresponding PS core network device and a corresponding radio access device based on a network attach status of the terminal, to trigger the terminal to use the corresponding preferred wireless network. This prevents a service from being affected because a wireless network used by the terminal does not meet the requirement, and helps the operator optimize network resources based on the service.

Embodiment 13

Figure 13:
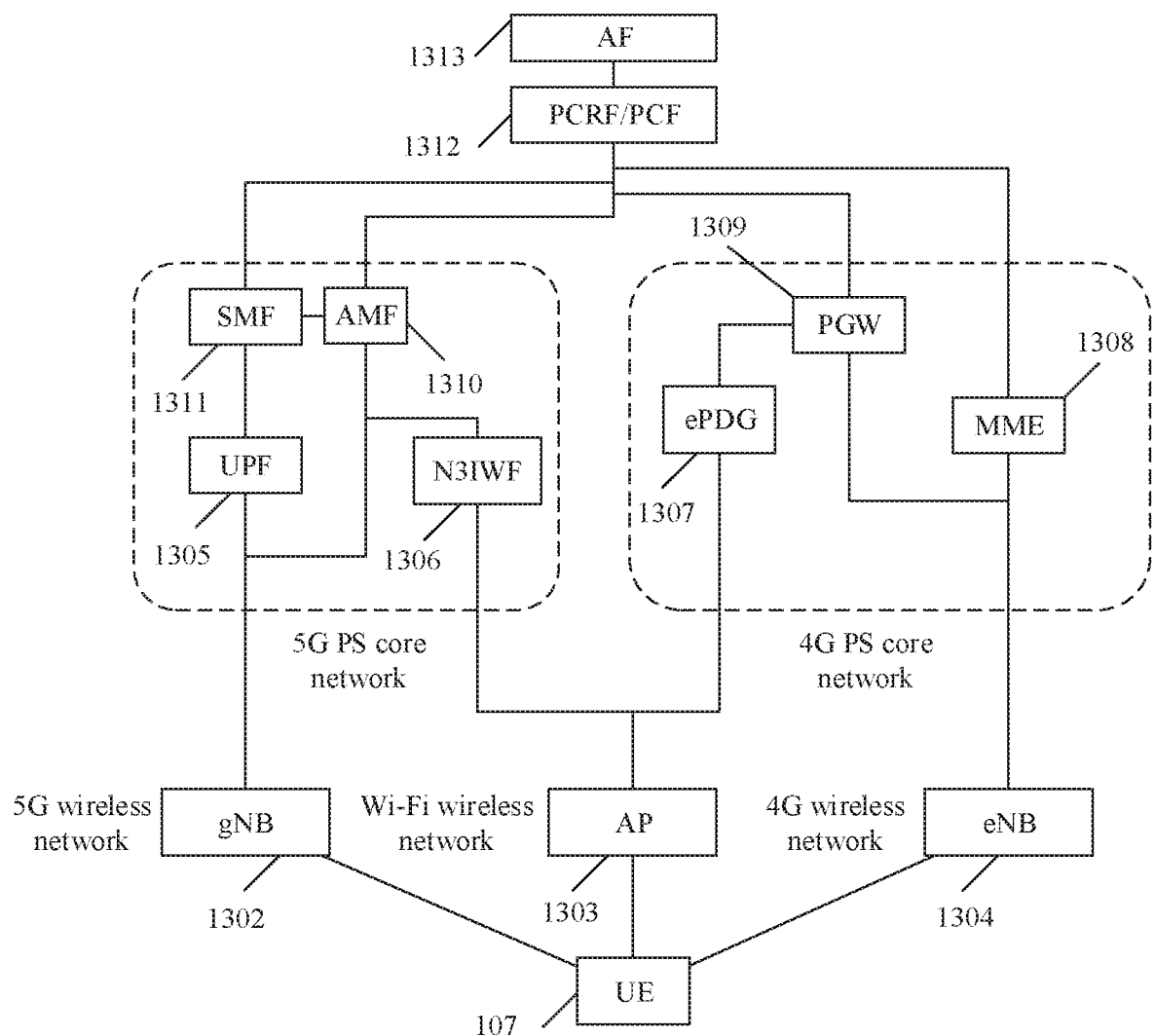
FIG. 13 is an architectural diagram of a system for controlling a terminal to use a wireless network according to an embodiment of this application.

FIG. 13 is an architectural diagram of a system for controlling a terminal to use a wireless network according to an embodiment of this application.

UE 107: The UE 107 is a terminal device. Similar to the terminal 107 in FIG. 1 or FIG. 2, the UE 107 may perform different services, such as a voice service or a video service, may report service information to an AF 1313 and use a specified wireless network when triggered by a gNB 1302 or an eNB 1304.

gNB 1302: The gNB 1302 is a 5G network base station, and may trigger, based on network use indication information delivered by an AMF 1310, a terminal to use a wireless network specified in the network use indication information.

AP 1303: The AP 1303 is a Wi-Fi wireless network access point (AP), and the UE 107 accesses a Wi-Fi wireless network via the AP 1303.

eNB 1304: The eNB 1304 is a 4G base station, and may trigger, based on network use indication information delivered by an MME 1308, the terminal to use a wireless network specified in the network use indication information.

UPF 1305: The UPF 1305 is a user plane function (UPF) device in a 5G core network, and may be configured to: receive network use indication information from a PCRF/PCF 1312, and send the network use indication information to the AMF 1310.

N3IWF 1306: The N3IWF 1306 is a non-3GPP interworking function (N3IWF) network element, and is configured to: connect a service on an AP to a 5G network, receive network use indication information delivered by the AMF 1310, and trigger the terminal to use a wireless network (a Wi-Fi wireless network) specified in the network use indication information.

ePDG 1307: The ePDG 1307 is an evolved packet data gateway (ePDG), and is configured to: connect a service on an AP to a 4G network, receive a network use indication information delivered by a PGW 1309, and trigger the terminal to use a wireless network (a Wi-Fi wireless network) specified in the network use indication information.

MME 1308: The MME 1308 is a mobility management entity (MME), and performs an access management function in a 4G network. The MME 1308 is configured to deliver, to the eNB 1304, network use indication information sent by the PGW 1309.

PGW 1309: The PGW 1309 is a public data network gateway, and serves as a session management function in a 4G network. The PGW 1309 is configured to deliver, to the eNB 1304 via the MME 1308, network use indication information sent by the PCRF/PCF 1312.

AMF 1310: The AMF 1310 is a core access and mobility management function, and serves as an access management function in a 5G network. The AMF 1310 is configured to deliver, to the gNB 1302, network use indication information sent by an SMF 1311.

SMF 1311: The SMF 1311 is a session management function in a 5G network, and delivers, to the gNB 1302 via the AMF 1310, network use indication information sent by the PCRF/PCF 1312.

PCRF/PCF 1312: The PCRF/PCF 1312 is a policy control device, and delivers, to a core network device (a core network device in a 4G network includes the PGW 1309, the MME 1308, and the like, and a core network device in a 5G network includes the SMF 1311, the AMF 1310, and the like), network use indication information sent by the AF 1313.

AF 1313: The AF 1313 is an application function device, and delivers network use indication information to the PCRF/PCF 1312 based on a device type, a service performed by a terminal, and a service requirement of an operator.

Embodiment 14

Figure 14A:
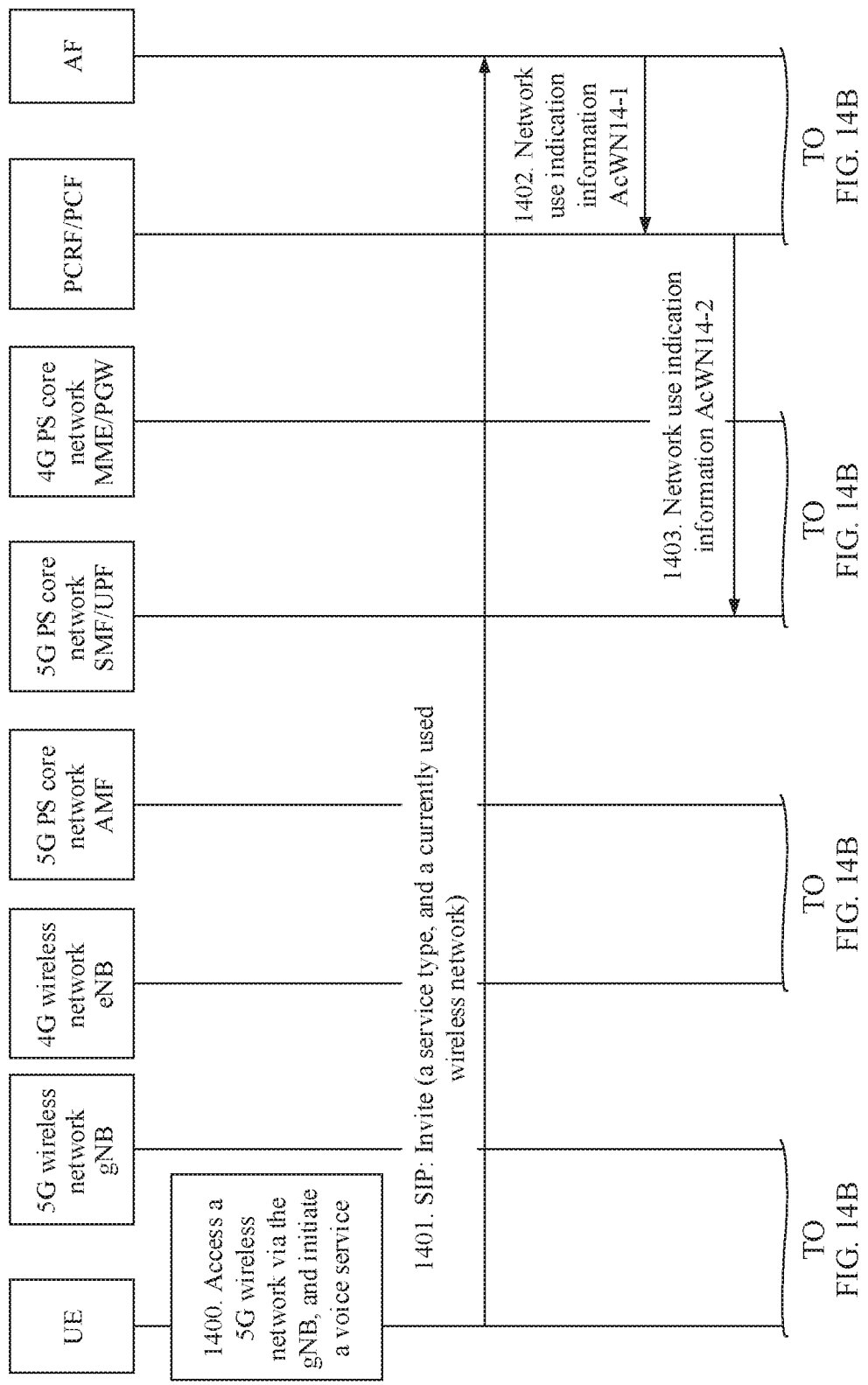

FIG. 14A and FIG. 14B are a flowchart of a method, on the basis of the architecture shown in FIG. 13, for controlling a terminal to use a preferred wireless network according to an embodiment of this application. An AF or a PCRF/PCF performs functions of the foregoing network decision device, and an SMF, a UPF, an AMF a gNB, and the like perform functions of the foregoing network trigger device. The network decision device herein may determine a preferred wireless network. Alternatively, the network decision device may determine a QoS indicator requirement for a wireless network, and transfer the QoS indicator requirement for a wireless network to the network trigger device, so that the network trigger device selects a wireless network for the terminal based on the QoS indicator requirement. It is assumed that an operator presets that "for a voice service, a 4G network is preferred", UE is a single-attach terminal, and the UE currently initiates a voice service through a 5G wireless network and has not attached to the 4G wireless network. In this case, the UE is handed over to the 4G wireless network to perform the voice service. A process is as follows:

Step 1400: The UE accesses a 5G wireless network via the gNB, and initiates a voice service.

Step 1401: The UE reports a service type and a currently used wireless network to the AF device.

Specifically, when initiating a voice call, the UE sends a session initiation protocol-invite (SIP-invite) request message to the AF device. The request message carries serviceType (which is a type of a service performed by the terminal, and the service type in this example is a voice service) and P-Access-Network-Info (which is type information of a wireless network currently used by the UE, and a type of the wireless network currently used by the UE in this example is the 5G wireless network).

Step 1402: The AF device sends network use indication information AcWN14-1 to the PCRF/PCF.

After receiving the SIP-invite request message from the UE, the AF device obtains the service type (serviceType field) and P-Access-Network-Info field in the message, and determines, based on a requirement preset by the operator (refer to Tables 1 to 3), that the wireless network currently used by the UE does not meet the requirement of the operator, and determines, based on a requirement preset by the operator, a type of a preferred radio access network that meets the requirement of the operator. In this example, it is assumed that the type of the preferred radio access network includes the 4G wireless network. Alternatively, the AP determines, based on a requirement preset by the operator (refer to Tables 4 to 6), that a QoS indicator of the wireless network currently used by the UE does not meet the requirement of the operator, and determines, based on a requirement preset by the operator, a QoS indicator requirement of the operator for a wireless network used by the UE. In this example, it is assumed that the QoS indicator requirement is a QoS indicator requirement that can be met by the 4G wireless network, for example, "a packet error rate (PER) <0.00005".

TABLE 4

Table of relationships between service types and QoS indicators requirements for preferred wireless networks

| Service type | QoS indicator requirements for preferred wireless networks | Description |
| --- | --- | --- |
| Voice call | Packet error rate (PER) < 0.00005 | The terminal should use a wireless network with a packet error rate less than 0.00005 when performing voice call service. |

TABLE 4-continued

Table of relationships between service types and QoS indicators
requirements for preferred wireless networks

| Service type | QoS indicator requirements for preferred wireless networks | Description |
| --- | --- | --- |
| Video call | Bandwidth (BW) > 100 M/s | A terminal should use a wireless network with a bandwidth greater than 100 M/s when performing a video call service. |
| Facebook/Twitter | A packet delay budget (PDB) < 1000 ms | The terminal should use a wireless network with a packet delay less than 1000 ms when performing a Facebook/Twitter service. |
| MCPTT service | PDB < 100 ms | The terminal should use a wireless network with a packet delay less than 100 ms when performing an MCPTT service. |

TABLE 5

Table of relationships between device types and QoS indicators
requirements for preferred wireless networks

| Device type | QoS indicator requirements for preferred wireless networks | Description |
| --- | --- | --- |
| Mobile phone terminal | BW > 100 M/s | The mobile phone terminal should use a wireless network with a bandwidth greater than 100 M/s. |
| Internet of things terminal | BW > 10 M/s | The internet of things terminal should use a wireless network with a bandwidth greater than 10 M/s. |

TABLE 6

Table of relationships between service types, device types, and
QoS indicators requirements for preferred wireless networks

| Device type | Service type | QoS indicator requirements for preferred wireless networks | Description |
| --- | --- | --- | --- |
| Internet of things terminal | Voice service | BW > 10 M/s<br>PDB < 100 ms | The internet of things terminal should use a wireless network with a bandwidth greater than 10 M/s and a packet delay less than 100 ms when performing a voice service. |
| MCPTT terminal | Video service | BW > 50 M/s<br>PDB < 80 ms | The MCPTT terminal should use a wireless network with a bandwidth greater than 50 M/s and a packet delay less than 80 ms when performing a video service. |

Further, the AF device sends the network use indication information AcWN14-1 to the PCRF/PCF through an authentication authorization request (AAR) message.

The AcWN14-1 includes UEId and WNArg. UEId represents a UE identifier, and WNArg represents a wireless network selection parameter. WNArg may include serviceType (service type) or ueType (device type) or may include qosReq (a QoS indicator requirement for a wireless network), or may include objWN (a target wireless network), or may even include optWNList (a list of preferred wireless networks). optWNList may include a plurality of RATs (Radio Access Technology), and each RAT represents one radio access network type.

The following is an example of a data structure of AcWN14-1:

```
AcWN{
    ueId+  //Terminal identifier
    WNArg{
        serviceType?  //Type of a service performed by a terminal
        ueType?//  Device type
            qosReq?  //QoS indicator requirement for a preferred wireless network
        optWNList{
            RAT*  //Wireless network information
        }?  //List of preferred wireless networks
        objWN?  //Target wireless network
    }+
}
```

Note:
"+" indicates that the field occurs once, "?" indicates that the field does not occur or occurs once, and "*" indicates that the field occurs a plurality of times.

If WNArg includes serviceType, qosReq, or optWNList, it indicates that the PCRF/PCF performs the functions of the network decision device, and the PCRF/PCF selects a wireless network for the UE.

Possible values of the RAT field or the objWN field are shown in Table 7.

TABLE 7

Table of types of wireless network

| RAT-TYPE value | Network name |
|---|---|
| 3GPP-E-UTRAN-FDD | 4G-FDD wireless network |
| 3GPP-E-UTRAN-TDD | 4G-TDD wireless network |
| WIFI | Wi-Fi wireless network |
| 3GPP-NG-RAN | 5G wireless network | optWNList may include a plurality of types of wireless networks. Types of wireless networks that can be accessed by the terminal may be included in optWNList in a priority-based sequence or in a sequence expected by the operator. If the network trigger device subsequently determines that coverage of a first wireless network in optWNList is poor or a signal in the first wireless network is weak, the network trigger device may select the second wireless network, and so on, and then it is more likely that the UE accesses a better wireless network or a wireless network expected by the operator.

In this embodiment, the AF device may set a value of AcWN14-1 as follows:

```
AcWN14-1{
    ueId=460012024007697T
    WNArg{
        optWNList{
            3GPP-E-UTRAN-FDD
            3GPP-E-UTRAN-TDD
        }
    }
}
```

Such AcWN14-1 is used to indicate the network trigger device to subsequently select one of the 4G-FDD wireless network or the 4G-TDD wireless network, to trigger the UE to use the wireless network.

The value of AcWN14-1 may alternatively be:

```
AcWN14-1{
    ueId=460012024007697T
    WNArg{
        objWN="3GPP-E-UTRAN-FDD"
    }
}
```

Such AcWN14-1 is used to indicate the network trigger device to subsequently trigger the UE to use the 4G-FDD wireless network.

The value of AcWN14-1 may alternatively be:

```
AcWN14-1{
    ueId=460012024007697T
    WNArg{
        qosReq="PER<0.00005"
    }
}
```

Such AcWN14-1 is used to indicate the network trigger device to subsequently trigger the UE to use a wireless network that meets the QoS indicator "PER<0.00005".

Optionally, the AF device may also send AcWN14-1 to the PCRF/PCF through an Npcf_PolicyAuthorization_Create Request message in addition to the AAR message.

The AF device may obtain, through P-Access-Network-Info in step 1401 or P-Access-Network-Info carried in an IMS registration message sent by the UE to the AF device, the type information of the wireless network currently accessed by the UE.

Step 1403: The PRCF/PCF sends network use indication information AcWN14-2 to the SMF/UPF.

After receiving and parsing the network use indication information AcWN14-1, the PCRF/PCF may transparently transmit AcWN14-1 (that is, copy AcWN14-1 to obtain AcWN14-2, and send AcWN14-2 to the SMF/UPF). Alternatively, the PCRF/PCF may determine a preferred wireless network or a target wireless network for the UE based on WNArg in AcWN14-1, include the preferred wireless network or the target wireless network in AcWN14-2, and then send AcWN14-2 to the SMF/UPF. Details are as follows:

(1) If WNArg includes serviceType or ueType, the PCRF/PCF may determine, based on serviceType or ueType, the QoS indicator requirement qosReq (refer to Tables 4 to 6) for the preferred wireless network, and include qosReq in AcWN14-2. Alternatively, the PCRF/PCF may determine one or more preferred wireless networks optWNList based on serviceType or ueType (for a determining method, refer to step 1202 and Tables 1 to 3), and include optWNList in AcWN14-2. Alternatively, the PCRF/PCF may determine the target wireless network objWN (which is the 4G wireless network in this example) from optWNList, and include objWN in AcWN14-2.

(2) If WNArg includes optWNList, the PCRF/PCF may include optWNList in AcWN14-2, or select the target wireless network objWN (which is the 4G wireless network in this example) from optWNList, and include objWN in AcWN14-2.

(3) If WNArg includes qosReq, the PCRF/PCF may include qosReq in AcWN14-2, or determine one or more preferred wireless networks optWNList based on qosReq, and include optWNList in AcWN14-2. Alternatively, the PCRF/PCF may determine the target wireless network objWN (which is the 4G wireless network in this example) from optWNList, and include objWN in AcWN14-2.

(4) If WNArg includes the target wireless network objWN, the PCRF/PCF may include objWN in AcWN14-2.

Optionally, the PCRF/PCF may send, through a PDN-CAN session modification message, AcWN14-2 to a PS core network device SMF/UPF corresponding to the wireless network currently used by the UE.

It should be noted that the PCRF/PCF may determine the PS core network device SMF/UPF corresponding to the wireless network currently used by the UE based on information (for example, correspondences between the UE identifier and addresses of the PS core network devices, including an SMF address, a UPF address, an AMF address, and the like) registered in the PCRF/PCF during a radio bearer setup process of the UE.

It should be noted that the "PCRF/PCF" may be a PCRF or a PCF, or may be a device in which both the PCRF and the PCF are deployed. This is not limited in this embodiment of this application. This is not repeated in subsequent embodiments.

It should be noted that the "SMF/UPF" may be an SMF or a UPF, or may be a device in which both the SMF and the UPF are deployed. This is not limited in this embodiment of this application. Optionally, the SMF or the UPF may transparently transmit the network use indication information. This is not repeated in subsequent embodiments.

Step 1404: The SMF/UPF sends network use indication information AcWN14-3 to the AMF.

After receiving and parsing AcWN14-2, the SMF/UPF sends the network use indication information AcWN14-3 to the AMF through a packet data unit (PDU) session modification command (SM request with PDU modification command). AcWN14-3 may be obtained by directly copying AcWN14-2, or by performing further processing based on content in AcWN14-2. For example, optWNList is filtered. For details, refer to the operations of the PCRF/PCF in step 1403.

Step 1405: The AMF sends the network use indication information AcWN14-3 to the gNB.

The AMF may send AcWN14-3 to the gNB through a message over an N2 interface between the AMF and the gNB in the 5G network.

Optionally, the AMF may further process content in AcWN 14-3, for example, filter optWNList in AcWN 14-3.

Step 1406: The gNB triggers the UE to set up a radio bearer in a wireless network (namely, the 4G wireless network) corresponding to AcWN14-3.

Specifically, the gNB receives and parses AcWN14-3, determines a target wireless network based on WNArg in AcWN14-3, and triggers the UE to use the target wireless network, to be specific, triggers the UE to set up a radio bearer in the target wireless network. Details are as follows:

(1) If WNArg includes optWNList, the gNB may select the target wireless network objWN (which is the 4G wireless network in this example) from optWNList, and then trigger the UE to set up a radio bearer in objWN.

(2) If WNArg includes qosReq, the gNB may determine one or more preferred wireless networks optWNList based on qosReq, and then determine the target wireless network objWN (which is the 4G wireless network in this example) from optWNList. Alternatively, the gNB may directly determine the target wireless network objWN based on qosReq, and trigger the UE to set up a radio bearer in objWN. For example, if the 4G wireless network meets the requirement "PER<0.00005", the gNB determines that the target wireless network is the 4G wireless network.

(3) If WNArg includes the target wireless network objWN, the gNB may trigger the UE to set up a radio bearer in objWN.

Specifically, the gNB may first measure information such as signal strength of the UE in the target wireless network objWN, and if the signal strength is weak, the gNB may not trigger the UE to use the wireless network. Alternatively, the gNB may determine a congestion status of the target wireless network. If the target wireless network is excessively congested, the gNB may not trigger the UE to use the wireless network because a voice service performed by the UE may be affected. The gNB subsequently sends, to the AMF, information indicating that the UE fails to establish a wireless channel, and then the AMF sends failure information to the SMF, to disconnect an existing PDU session of the UE (Note: The UE can use only one PDU session at a time. Therefore, to perform a service through a new wireless network, the existing PDU session of the UE has to be disconnected). Finally, the UE is handed over to the target wireless network, and sets up a new radio bearer or establishes a new wireless channel.

Step 1407: The UE performs the voice service on the new radio bearer.

The UE continues to perform the voice service on the new radio bearer (namely, a radio bearer in the 4G wireless network).

According to Embodiment 14, when the UE performs a voice service through the 5G wireless network and has not attached to the 4G network, a network side may trigger handover of the UE to the 4G wireless network to perform the voice service. In this way, use of 5G network resources can be optimized.

According to Embodiment 14, the UE has not attached to the target wireless network, and a wireless network access device currently used by the UE can be used to trigger the UE to use the target wireless network, without modifying an existing interface between the wireless network access device and the UE. A case in which the UE has attached to the target wireless network is further described in the following embodiment provided in this application.

Embodiment 15

Figure 15:
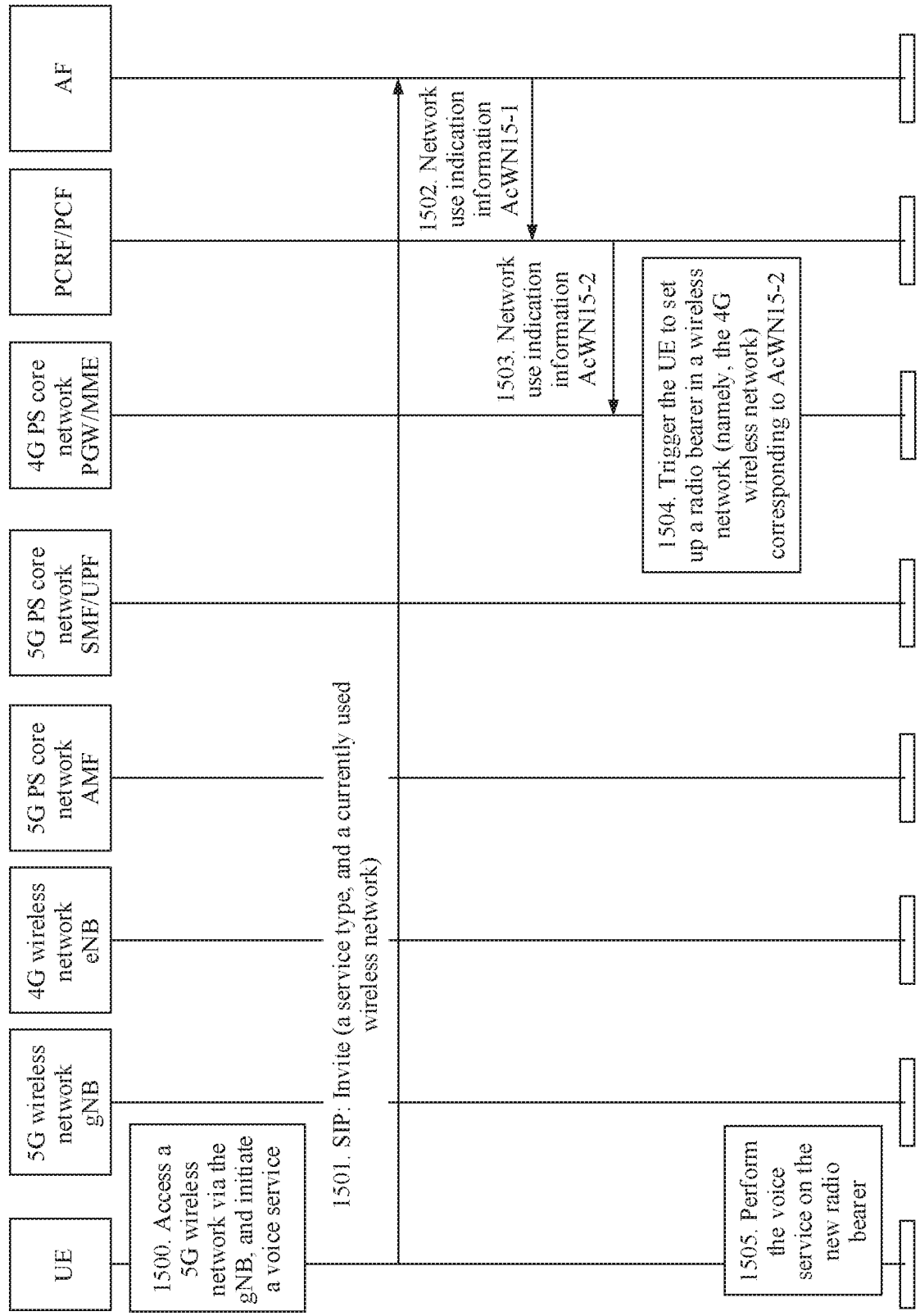
FIG. 15 is a flowchart of a method for controlling a terminal to use a preferred wireless network according to an embodiment of this application.

FIG. 15 is a flowchart of a method, on the basis of the architecture shown in FIG. 13, for controlling a terminal to use a preferred wireless network according to an embodiment of this application. An AF or a PCRF/PCF performs functions of the foregoing network decision device, and a PGW or an MME or the like performs functions of the foregoing network trigger device. It is assumed that an operator presets that "for a voice service, a 4G network is preferred", UE is a dual-attach terminal, and the UE currently attaches to both a 5G wireless network and a 4G wireless network, and initiates a voice service through the 5G wireless network. In this case, the UE is handed over to the 4G wireless network to perform the voice service. A process is as follows:

Steps 1500 to 1502: Similar to steps 1400 to 1402.

Step 1503: The PCRF/PCF sends network use indication information AcWN15-2 to the PGW/MME.

After receiving and parsing AcWN15-1 sent by the AF device, the PCRF/PCF determines a target wireless network (which is the 4G wireless network in this example) based on WNArg in AcWN15-1.

The PCRF/PCF obtains information about a wireless network to which the UE currently attaches (for example, information about a list of wireless networks to which the UE that attaches and that are registered with the PCRF/PCF based on a UE attach process), determines that the UE has attached to the target wireless network, and sends the network use indication information AcWN15-2 to a PS core network device (which is the 4G PS core network device PGW/MME in this example) corresponding to the target wireless network. An example of AcWN15-2 is as follows:

```
AcWN15-2{
    460012024007697T
    WNArg{
        objWN="3GPP-E-UTRAN-FDD"
    }
}
```

For a meaning of the field, refer to the description in the foregoing embodiment. Because it is determined that the UE has attached to the target wireless network, AcWN15-2 may include the target wireless network instead of other selection parameters (for example, qosReq).

It should be noted that the "PGW/MME" may be the PGW or the MME, or may be a device in which both the PGW and the MME are deployed. This is not limited in this embodiment of this application, and details are not described subsequently.

Step 1504: The PGW/MME triggers the UE to set up a radio bearer in a wireless network (namely, the 4G wireless network) corresponding to AcWN15-2.

Specifically, the PGW/MME notifies, via a target wireless network access device (eNB), the UE to set up a radio bearer or to establish a wireless channel. The PGW/MME needs to address the target wireless network access device (eNB) based on ueId in AcWN15-2, and send a radio bearer setup request message to the target wireless network access device (eNB). Optionally, the target wireless network access device (eNB) may trigger the UE to disconnect from an existing PDU session.

Step 1505: The UE performs the voice service on the new radio bearer. This is similar to step 1407.

According to Embodiment 15, when the UE performs a voice service through the 5G wireless network and has attached to the 4G network at the same time, a policy control device and the PS core network device corresponding to the target wireless network can be used to trigger the UE to use the 4G wireless network to perform the voice service. In this way, use of 5G network resources can be optimized.

According to Embodiment 15, the PCRF/PCF determines an attach status of the UE, and selects, based on the attach status of the UE, the PS core network device corresponding to the target wireless network as the network trigger device. Alternatively, a PS core network device corresponding to a wireless network currently used by the UE may determine an attach status of the UE, and select a corresponding network trigger device, as shown in Embodiment 16.

Embodiment 16

Figure 16:
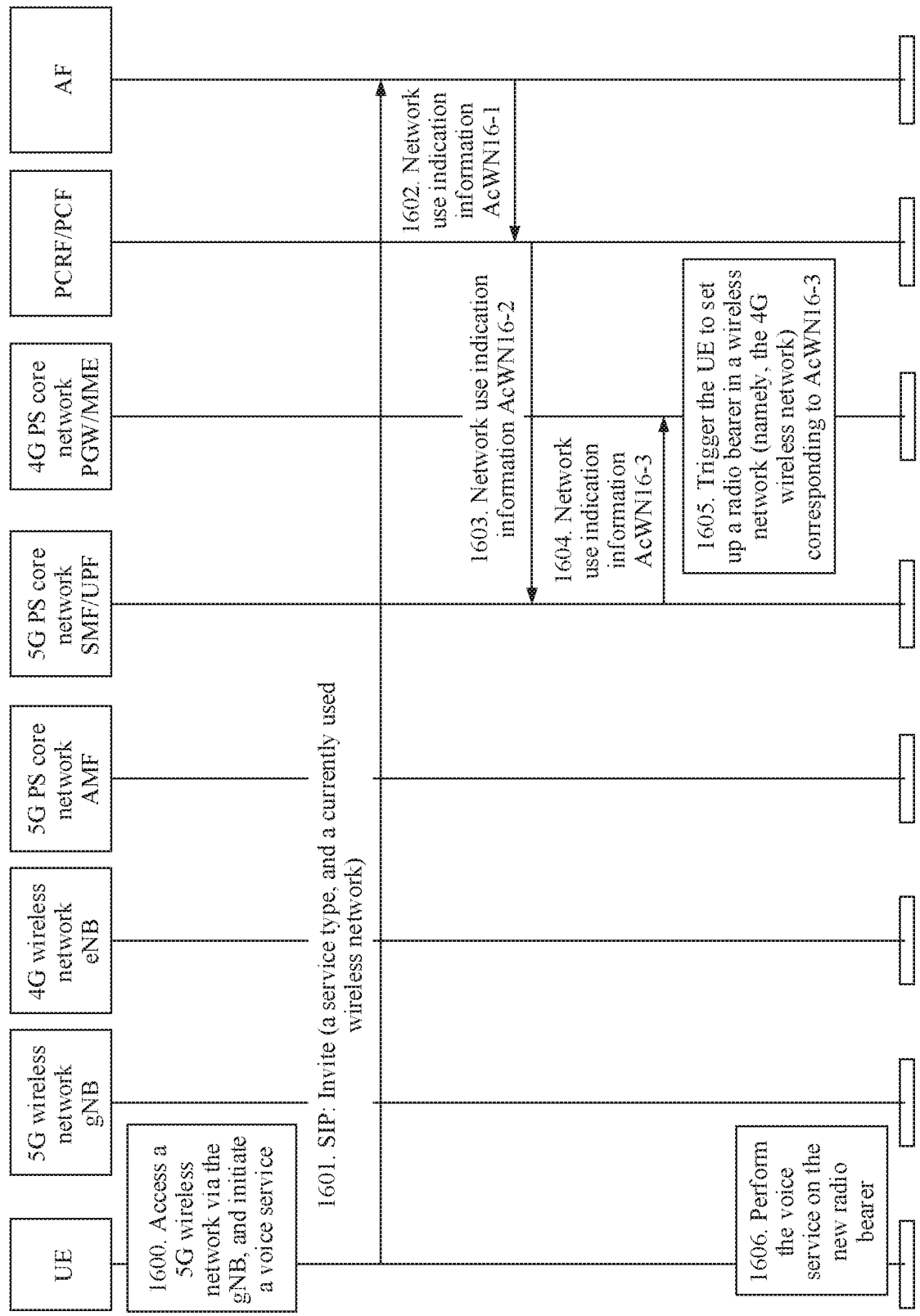
FIG. 16 is a flowchart of a method for controlling a terminal to use a preferred wireless network according to an embodiment of this application.

FIG. 16 is a flowchart of a method, on the basis of the architecture shown in FIG. 13, for controlling a terminal to use a preferred wireless network according to an embodiment of this application. An AF or a PCRF/PCF performs functions of the foregoing network decision device, and an SMF or a UPF, a PGW or an MME, and the like perform functions of the foregoing network trigger device. It is assumed that an operator presets that "for a voice service, a 4G network is preferred", UE is a dual-attach terminal, and the UE currently attaches to both a 5G wireless network and a 4G wireless network, and initiates a voice service through the 5G wireless network. In this case, the UE is handed over to the 4G wireless network to perform the voice service. A process is as follows:

Steps 1600 to 1603: Similar to steps 1400 to 1403.

Step 1604: The SMF/UPF sends network use indication information AcWN16-3 to the PGW/MME.

After receiving and parsing network use indication information AcWN16-2, the SMF/UPF determines a target wireless network based on AcWN16-2, and obtains a current wireless network attach status of the UE. In addition, the SMF/UPF determines that the UE has attached to the target wireless network (which is the 4G wireless network in this embodiment), and sends the network use indication information AcWN16-3 to the PS core network device PGW/MME corresponding to the target wireless network. An example of AcWN16-3 is as follows:

```
AcWN16-3{
    460012024007697T
    WNArg{
        objWN="3GPP-E-UTRAN-FDD"
    }
}.
```

For a meaning of the field, refer to the description in the foregoing embodiment. Because it is determined that the UE has attached to the target wireless network, AcWN16-3 may include the target wireless network instead of other selection parameters (for example, qosReq).

Step 1605: Similar to step 1504.

Step 1606: Similar to step 1505.

According to Embodiment 16, when the UE performs a voice service through the 5G wireless network and has attached to the 4G network at the same, a policy control device, a PS core network device corresponding to a wireless network currently used by the UE, and the PS core network device corresponding to the target wireless network can be used to trigger the UE to use the 4G wireless network to perform the voice service. In this way, use of 5G network resources can be optimized.

When the target wireless network is a Wi-Fi wireless network, an adaptation device (an N3IWF or an ePDG) corresponding to the Wi-Fi wireless network may be used to trigger the terminal to use the Wi-Fi wireless network. For details, refer to Embodiment 17.

Embodiment 17

Figure 17B:
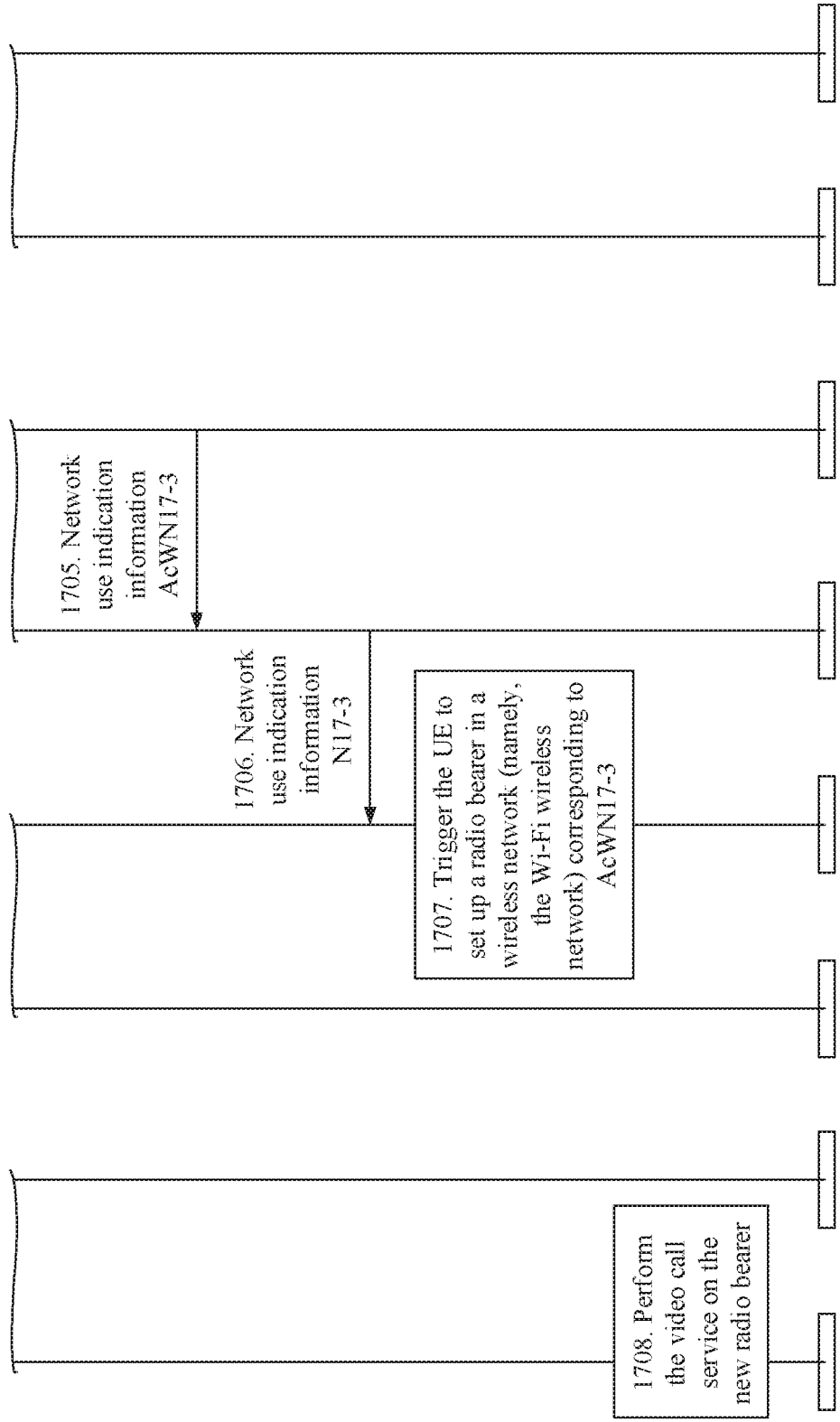

FIG. 17A and FIG. 17B are a flowchart of a method, on the basis of the architecture shown in FIG. 13, for controlling a terminal to use a preferred wireless network according to an embodiment of this application. An AF and a PCRF/PCF perform functions of the foregoing network decision device, and an SMF, an AMF, and an N3IWF perform functions of the foregoing network trigger device. It is assumed that an operator presets that "for a video call service, a Wi-Fi network is preferred", UE has attached to both a 5G wireless network and a Wi-Fi wireless network, and the UE currently initiates a video call service through the 5G wireless network. In this case, the UE uses the Wi-Fi wireless network to perform the video call service. A process is as follows:

Step 1700: The UE attaches to the Wi-Fi wireless network.

Steps 1701 to 1703: Similar to steps 1400 to 1402.

It should be noted that a sequence of step 1700 and steps 1701 to 1703 is not limited in this embodiment of this application.

Step 1704: The PCRF/PCF sends network use indication information AcWN17-2 to the SMF.

The PCRF/PCF determines that the UE has attached to a target wireless network (which is the Wi-Fi wireless network in this example), and determines that an AP in the Wi-Fi wireless network to which the UE attaches accesses a 5G PS core network via the N3IWF. In this case, the PCRF/PCF sends the network use indication information AcWN17-2 to the 5G PS core network device SMF. An example of AcWN17-2 is as follows:

```
AcWN17-2{
   ueId=460012024007697T
   WNArg{
      objWN= "WIFI"
   }
}
```

It should be noted that, when the UE has not attached to the Wi-Fi wireless network, a network side cannot trigger the UE to use the Wi-Fi wireless network. Therefore, if the PCRF/PCF determines that the UE has not attached to the Wi-Fi wireless network, a procedure is terminated, or failure information that is used to indicate a failure of triggering the UE to use the Wi-Fi wireless network is returned to the AF device.

Step 1705: The SMF sends network use indication information AcWN17-3 to the AMF.

This is similar to step 1404. AcWN17-3 may be obtained by copying AcWN17-2.

Step 1706: The AMF sends the network use indication information AcWN17-3 to the N3IWF.

The AMF determines an address of the corresponding N31WF device based on information (for example, correspondences between a terminal identifier and N3IWF addresses) registered with a network side in a process in which the UE attaches to the Wi-Fi wireless network, and sends AcWN17-3 to the N3IWF.

Optionally, the AMF sends AcWN17-3 to the N3IWF through an N2 interface message.

A difference between this embodiment and Embodiment 15 and Embodiment 16 lies in the following: In Embodiment 15 and Embodiment 16, a PS core network sends network use indication information to a radio access device corresponding to a target wireless network, but in this embodiment, the PS core network device send the network use indication information to an adaptation device (for example, the N3IWF or an ePDG) between an access device (AP) of the target wireless network (the Wi-Fi wireless network) and the PS core network instead of the access device of the target wireless network (the Wi-Fi wireless network). Therefore, the PS core network device, such as the SMF/AMF, needs to determine, based on different types of target wireless networks, a path (to a specific device) of transmitting the network use indication information. For example, a path may be determined based on the following logic:

(1) If the target wireless network is the Wi-Fi wireless network:

If a PS core network corresponding to the target wireless network is the same as a core network corresponding to a wireless network currently used by the terminal, the network use indication information may be sent to an adaptation device (for example, the N31WF or the ePDG) between the target wireless network (the Wi-Fi wireless network) and the PS core network, and the adaptation device triggers the terminal to use the target wireless network.

If a PS core network corresponding to the target wireless network is different from a core network corresponding to a wireless network currently used by the terminal, the network use indication information may be sent to the PS core network device corresponding to the target wireless network. The PS core network device corresponding to the target wireless network sends the network use indication information to the foregoing adaptation device (for example, the N3IWF or the ePDG), and the adaptation device triggers the terminal to use the target wireless network.

(2) If the target wireless network is not the Wi-Fi wireless network, the network use indication information is sent to the radio access device corresponding to the target wireless network, and the access device triggers the terminal to use the target wireless network.

Step 1707: The N3IWF triggers the UE to set up a radio bearer in a wireless network (namely, the Wi-Fi wireless network) corresponding to AcWN17-3.

The N31WF triggers the UE to set up a new radio bearer in the Wi-Fi wireless network.

A process in which the N3IWF or the ePDG triggers the UE to use the target wireless network (the Wi-Fi wireless network) is similar to the process in step 1406 (the wireless network access device triggers the terminal to use the wireless network) in Embodiment 14. Details are not described herein again.

Step 1708: The UE performs the video call service on the new radio bearer.

It should be noted that, in step 1704, if the PCRF/PCF determines that the AP accesses a 4G PS core network via the ePDG, the PCRF/PCF should send the network use indication information AcWN17-2 to a PGW, so that the ePDG can trigger the terminal to use the Wi-Fi wireless network.

According to Embodiment 17, when the UE performs a video call service through the 5G wireless network and has attached to the Wi-Fi wireless network at the same time, a policy control device, a PS core network device corresponding to the wireless network currently used by the UE, and the evolved packet data gateway device (ePDG) or the non-3GPP interworking function device (N3IWF) corresponding to the target wireless network can be used to trigger the UE to use the Wi-Fi wireless network to perform the video call service. In this way, use of 5G network resources can be optimized.

Embodiment 18

Figure 18:
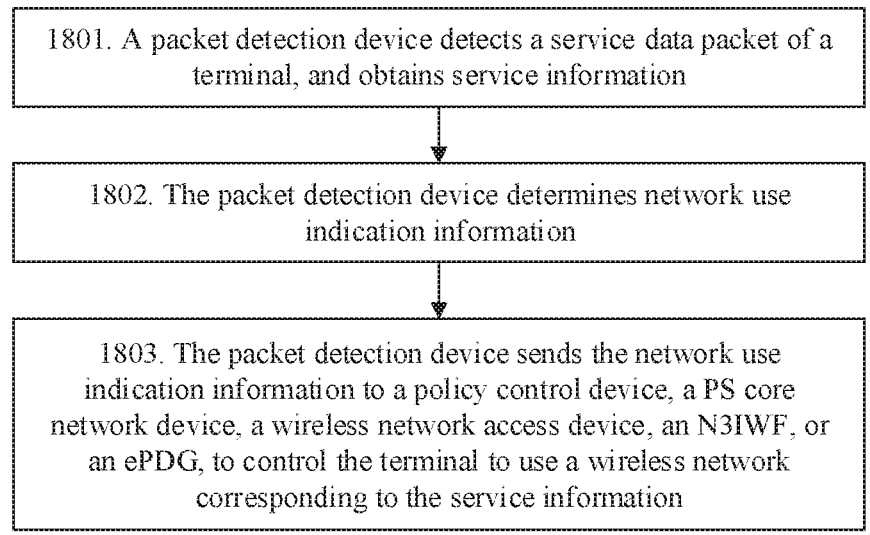
FIG. 18 is a flowchart of a method for controlling, by a packet detection device, a terminal to use a wireless network according to an embodiment of this application.

FIG. 18 is a flowchart of a method for controlling, by a packet detection device, a terminal to use a wireless network according to an embodiment of this application. The packet detection device may perform functions of the foregoing network decision device. The method specifically includes the following steps:

Step 1801: The packet detection device detects a data packet of a service of the terminal, and obtains service information.

The packet detection device detects a data packet in a data gateway, and obtains a terminal identifier, and a device type and/or service information, where the service information is information about a service currently performed by the terminal.

Step 1802: The packet detection device determines network use indication information.

The packet detection device determines a wireless network selection parameter based on the obtained device type and/or service information. The determined wireless network selection parameter may include a target wireless network, a candidate wireless network list, a QoS indicator requirement for a wireless network, or the like. The packet detection device constructs the network use indication information based on the determined wireless network selection parameter. For details, reference may be made to Embodiment 14 and the like.

Step 1803: The packet detection device sends the network use indication information to a policy control device, a PS core network device, a wireless network access device, an N3IWF, or an ePDG, to control the terminal to use a wireless network corresponding to the service information.

Optionally, the packet detection device may send the network use indication information to the policy control device, the PS core network device, and the wireless network access device. The PS core network device may be a PS core network device corresponding to a wireless network currently used by the terminal, or may be a PS core network device of the determined target wireless network. The wireless network access device may be a radio access device corresponding to the wireless network currently used by the terminal, or may be a radio access device corresponding to the target wireless network.

Optionally, the packet detection device may further send the network use indication information to the N3IWF or the ePDG, to indicate the N3IWF or the ePDG to trigger the terminal to use the target wireless network. For a process in which the N3IWF or the ePDG triggers the terminal to use the target wireless network, refer to Embodiment 17.

Embodiment 19

Figure 19:
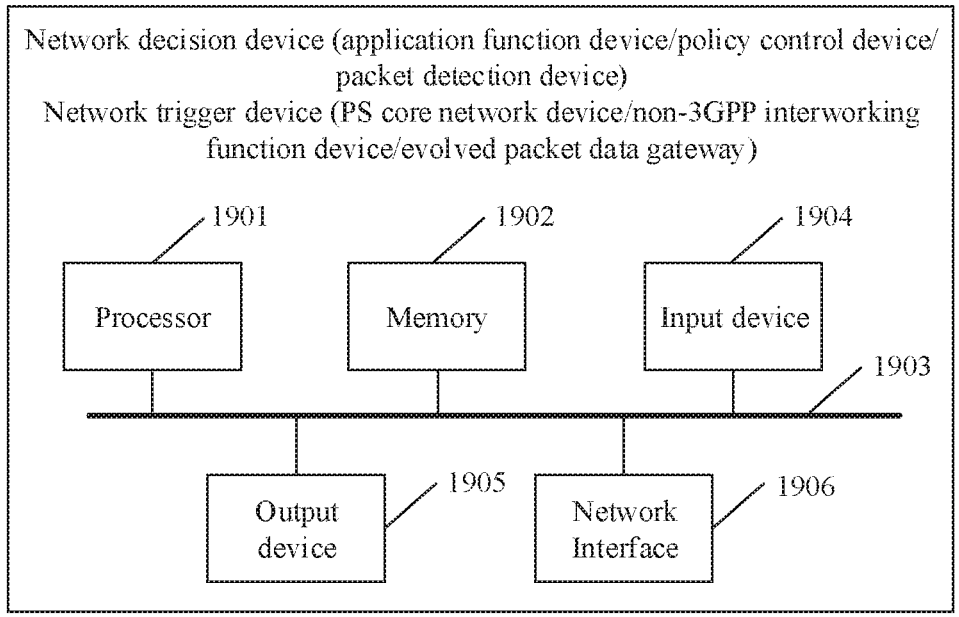
FIG. 19 is a diagram of a hardware structure of a network decision device/network trigger device according to an embodiment of this application.

FIG. 19 is a diagram of a hardware structure of a communications network device according to an embodiment of this application. In all the embodiments of this application, an application function device, a policy control device, and a packet detection device that perform functions of a network decision device, and a PS core network device, a non-3GPP interworking function device, an evolved packet data gateway, and the like that perform functions of a network trigger device may all use general-purpose computer hardware shown in FIG. 19. The hardware includes a processor 1901, a memory 1902, a bus 1903, an input device 1904, an output device 1905, and a network interface 1906.

Specifically, the memory 1902 may include a computer storage medium in a form of a volatile and/or nonvolatile memory, for example, a read-only memory and/or a random access memory. The memory 1902 can store an operating system, an application program, another program module, executable code, and program data.

The input device 1904 may be configured to enter information, so that a system administrator can operate and manage the device, for example, configure a requirement of an operator for a wireless network used by a terminal. The input device 1904 may be a keyboard or a pointing device, such as a mouse, a trackball, a touchpad, a microphone, a joystick, a game pad, a satellite television antenna, a scanner, or a similar device. These input devices may be connected to the processor 1901 through the bus 1903.

The output device 1905 may be configured to output information, so that the system administrator can operate and manage the device. The output device 1905 may be a monitor, or another peripheral output device, for example, a loudspeaker and/or a print device. These output devices may also be connected to the processor 1901 through the bus 1903.

The device (a network decision device or a network trigger device) may be connected to a network, for example, a local area network (LAN) through the network interface 1906. When there is a network connection, a computer-executable instruction stored in the device may be stored in a remote storage device, and is not necessarily stored locally.

When the processor 1901 in the device executes the executable code or the application program stored in the memory 1902, if the device is a network decision device, the device may perform the method steps corresponding to the network decision device (for example, the application function device, the policy control device, or the packet detection device) in all the foregoing embodiments. If the device is a network trigger device, the device may perform the method steps corresponding to the network trigger device (for example, the PS core network device, the non-3GPP interworking function device, or the evolved packet data gateway) in all the foregoing embodiments. For a specific execution process, refer to the foregoing embodiments. Details are not described herein again.

Embodiment 20

Figure 20:
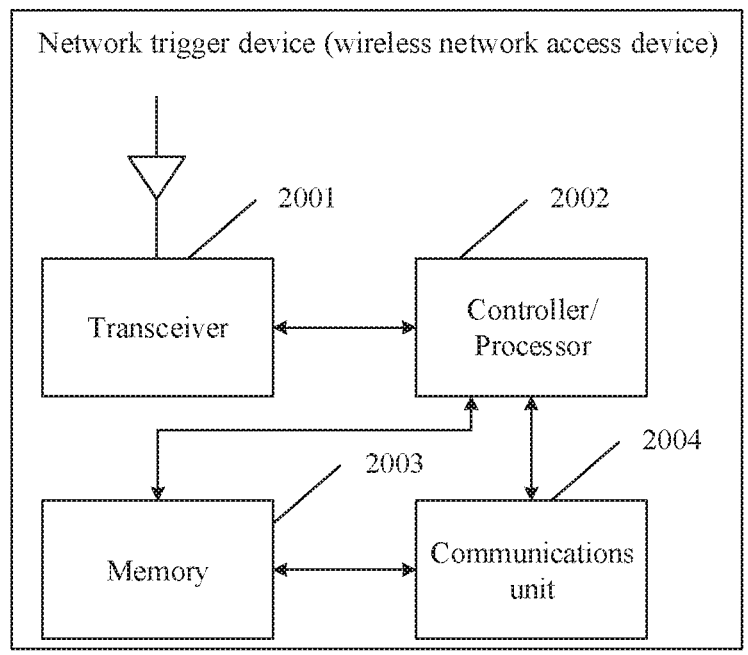
FIG. 20 is a diagram of a hardware structure of a network trigger device (a wireless network access device) according to an embodiment of this application.

FIG. 20 is a schematic structural diagram of a radio access device that performs a function of a network trigger device according to an embodiment of this application. The radio access device may be gNB 1302, eNB 1304, or the like shown in FIG. 13.

The radio access device shown in FIG. 20 includes a transceiver 2001, a controller/processor 2002, a memory 2003, and a communications unit 2004. The transceiver 2001 may be configured to support information receiving and sending between a base station and the UE in the foregoing embodiments, and support radio communication between the UE and another UE. The controller/processor 2002 may be configured to perform various functions for communicating with the UE or another network device. On uplink, an uplink signal from the UE is received by using an antenna, demodulated by the transceiver 2001, and further processed by the controller/processor 2002, to restore service data and signaling information sent by the UE. On downlink, service data and a signaling message are processed by the controller/processor 2002 and are demodulated by the transceiver 2001 to generate a downlink signal, and the downlink signal is transmitted to UE by using an antenna. The controller/processor 2002 is further configured to perform the method for triggering a terminal to use a wireless network described in the foregoing embodiments.

It may be understood that FIG. 20 shows only a simplified design of the radio access device. During actual application, the radio access device may include any quantity of transmitters, receivers, processors, controllers, memories, communications units, or the like. All radio access devices that can implement this application fall within the protection scope of this application.

Embodiment 21

Figure 21:
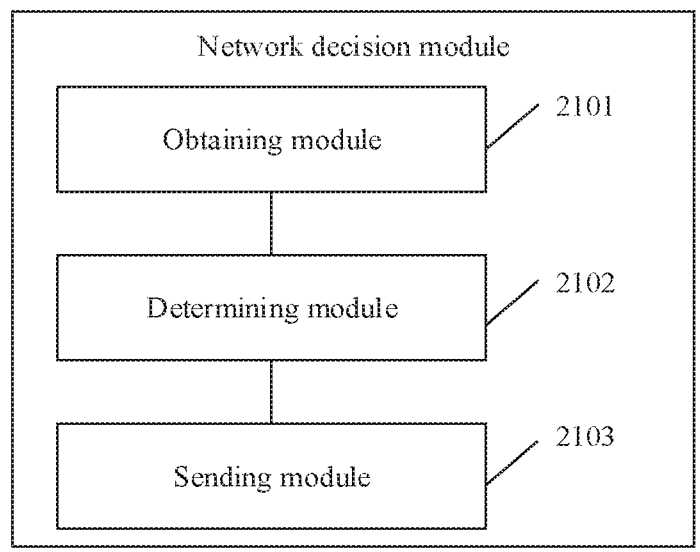
FIG. 21 is a schematic structural diagram of a network decision device according to an embodiment of this application.

FIG. 21 is a schematic structural diagram of a network decision device according to an embodiment of this application. The network decision device includes: an obtaining module 2101, a determining module 2102, and a sending module 2103.

The obtaining module 2101 is configured to obtain a terminal identifier of a terminal and service information of the terminal. For a specific execution process, refer to the descriptions of steps related to the network decision device side in Embodiment 1 to Embodiment 19, for example, steps 301, 501, 601, 1201, and 1401.

Optionally, the obtaining module 2101 may obtain the terminal identifier and the service information from a message sent by the terminal to the network decision device, or may obtain the terminal identifier and the service information by analyzing a data packet of a service of the terminal.

The determining module 2102 is configured to determine, based on the service information, a wireless network available to the terminal, where the available wireless network includes one or more wireless networks. For a specific execution process, refer to the descriptions of steps related to the network decision device side in Embodiment 1 to Embodiment 19, for example, steps 302, 502, and 602.

Optionally, the determining module 2102 may further include priority information of the one or more wireless networks in the available wireless network set, so that a receiver of the available wireless network can further select a wireless network based on the priority information.

Optionally, the determining module 2102 may determine the available wireless network by querying information about a correspondence between service information and a wireless network, where the information about the correspondence may be preset in the network decision device, or may be dynamically determined by the network decision device based on a network status.

The sending module 2103 is configured to send indication information to a network trigger device, to indicate the network trigger device to trigger the terminal to use a wireless network in the available wireless network set. For a specific execution process, refer to the descriptions of steps related to the network decision device side in Embodiment 1 to Embodiment 19, for example, steps 303, 402, and 503.

Optionally, the sending module 2103 may determine the network trigger device based on an attach status of the terminal, and send the indication information to the determined network trigger device.

Optionally, the sending module 2103 may determine a target wireless network from the available wireless network set, determine or select the network trigger device based on the attach status of the terminal (including information about a wireless network to which the terminal has attached) and the target wireless network, and send the indication information to the determined or selected network trigger device, where the indication information includes the terminal identifier and the target wireless network.

Optionally, the sending module 2103 may determine that in the available wireless network set, a wireless network with a highest priority, a wireless network with an optimal QoS indicator, or a wireless network to which the terminal has attached is the target wireless network.

Optionally, the sending module 2103 may transfer all the available wireless network set to the network trigger device, and the network trigger device selects or determines the target wireless network from the available wireless network set, and triggers the terminal to use the target wireless network.

Optionally, the sending module 2103 may determine or select the network trigger device based on network connection information, and send the indication information to the determined network trigger device, where the indication information includes the terminal identifier and the available wireless network.

In this embodiment, the network decision device is presented in a form of a function module. The "module" herein may be an application-specific integrated circuit (ASIC), a circuit, a processor and a memory for executing one or more software or firmware programs, an integrated logic circuit, and/or another device that can provide the foregoing function. In a simple embodiment, a person skilled in the art may figure out that a client may also be in the form shown in FIG. 19. The obtaining module 2101, the determining module 2102, and the sending module 2103 may all be implemented by using the processor 1901 and the memory 1902 in FIG. 19. For example, a function of the determining module 2102 of determining, based on the service information, a wireless network available to the terminal may be implemented by the processor 1901 by executing the code stored in the memory 1902.

Embodiment 22

Figure 22:
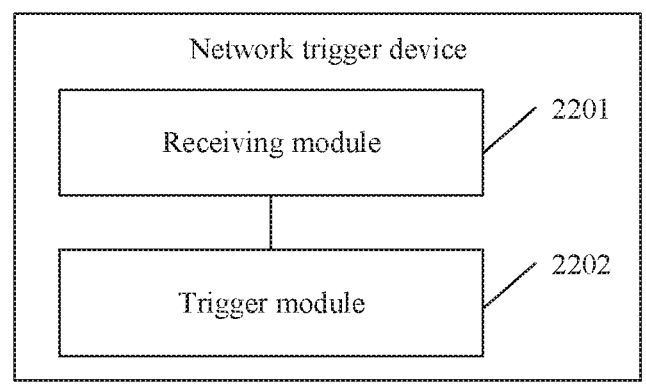
FIG. 22 is a schematic structural diagram of a network trigger device according to an embodiment of this application.

FIG. 22 is a schematic structural diagram of a network trigger device according to an embodiment of this application. The network trigger device includes: a receiving module 2201 and a trigger module 2202.

The receiving module 2201 is configured to receive first indication information, where the first indication information includes a terminal identifier of a terminal and a first available wireless network set. For a specific execution process, refer to the descriptions of steps related to the network trigger device side in Embodiment 1 to Embodiment 19, for example, steps 701, 801, 901, and 1001.

Optionally, the receiving module 2201 may receive the first indication information from a network decision device or another network trigger device.

The trigger module 2202 is configured to trigger the terminal to use a wireless network in the first available wireless network set to perform a service. For a specific execution process, refer to the descriptions of steps related to the network trigger device side in Embodiment 1 to Embodiment 19, for example, steps 702, 802, 902, and 1002.

Optionally, the trigger module 2202 may trigger the terminal to use a wireless network in the first available wireless network set, so that the terminal sets up a radio bearer in the wireless network in the first available wireless network set to perform a service. Optionally, the trigger module 2202 may select a target wireless network from the first available wireless network set, and trigger the terminal to use the target wireless network. Optionally, a first network trigger device may select, from the first available wireless network set, a wireless network with a highest priority or a wireless network with an optimal QoS indicator as the target wireless network.

Optionally, the trigger module 2202 may alternatively send all or a part of the first available wireless network set to a second network trigger device, and the second network trigger device triggers the terminal to use a wireless network in the first available wireless network set. For example, the trigger module 2202 sends second indication information to the second network trigger device, where the second indication information includes the terminal identifier and a second available wireless network, and the second available wireless network includes all or a part of the first available wireless network set. The second network trigger device triggers the terminal to use a wireless network in the second available wireless network set. Optionally, the trigger module 2202 may select a target wireless network from the first available wireless network set, and send the target wireless network to the second network trigger device. Optionally, the trigger module 2202 may select, from the first available wireless network set, a wireless network with a highest priority, a wireless network with an optimal QoS indicator, or a wireless network to which the terminal has attached as the target wireless network.

In this embodiment, the network trigger device is presented in a form of a function module. The "module" herein may be an application-specific integrated circuit (ASIC), a circuit, a processor and a memory for executing one or more software or firmware programs, an integrated logic circuit, and/or another device that can provide the foregoing function. In a simple embodiment, a person skilled in the art may figure out that a client may also be in the form shown in FIG. 19. Both the receiving module 2201 and the trigger module 2202 may be implemented by using the controller/processor 2002 and the memory 2003 in FIG. 20. For example, a function of the trigger module 2202 of triggering the terminal to use the available wireless network may be implemented by the controller/processor 2002 by executing the code stored in the memory 2003.

A person of ordinary skill in the art may be aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, division into units is merely logical function division and may be another division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments in this application.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in a form of a software product. The software product is stored in a storage medium and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific embodiments of this application, but are not intended to limit the protection scope of this application. Any modification or replacement readily figured out by a person skilled in the art within the technical scope disclosed in this application shall fall within the protection scope of this application. Therefore, the protection scope of this application shall be subject to the protection scope of the claims.

What is claimed is:

1. A method for controlling a terminal to use a wireless network, applied to a network decision device, comprising:
    obtaining, by the network decision device, a terminal identifier of the terminal and service information, wherein the service information is information related to a service performed by the terminal, and wherein the network decision device is a policy control device, and the obtaining, by the network decision device, the terminal identifier and service information comprises: obtaining, by the policy control device, the terminal identifier and the service information from an application function device or a packet detection device;
    determining, by the network decision device based on the service information, an available wireless network set available to the terminal, wherein the available wireless network set comprises one or more wireless networks;
    selecting, by the network decision device and based on an attach status of the terminal, a network trigger device; and
    sending, by the network decision device, indication information to the network trigger device, to indicate the network trigger device to trigger the terminal to use a wireless network in the available wireless network set, wherein the indication information comprises the terminal identifier and at least a portion of the available wireless network set, wherein the network trigger device is a packet core network device corresponding to the wireless network currently used by the terminal, and the sending, by the network decision device, indication information to the network trigger device comprises: sending, by the policy control device, the indication information to the packet core network device corresponding to the wireless network currently used by the terminal.

2. The method according to claim 1, wherein the selecting, by the network decision device and based on the attach status of the terminal, the network trigger device comprises:
   determining a target wireless network from the available wireless network set;
   selecting the network trigger device based on the attach status of the terminal and the target wireless network; and
   wherein the indication information comprises the terminal identifier and the target wireless network.

3. The method according to claim 2, wherein the determining, by the network decision device, the target wireless network from the available wireless network set comprises:
   determining that in the available wireless network set, a wireless network with a highest priority, a wireless network with an optimal quality of service (QoS) indicator, or a wireless network to which the terminal has attached is the target wireless network.

4. The method according to claim 2, wherein the determining, by the network decision device, the network trigger device based on the attach status of the terminal and the target wireless network comprises:
   determining that the terminal has not attached to the target wireless network, and determining that a packet core network device corresponding to a wireless network currently used by the terminal is the network trigger device.

5. The method according to claim 1, wherein the determining, by the network decision device, the available wireless network set based on the service information comprises:
   determining the available wireless network set by querying information about a correspondence between service information and a wireless network.

6. The method according to claim 1, wherein the available wireless network set further comprises priority information of the one or more wireless networks.

7. The method according to claim 1, wherein the terminal is a user terminal.

8. A method for controlling a terminal to use a wireless network, applied to a first network trigger device, comprising:
   receiving, by the first network trigger device from a network decision device, first indication information, wherein the first indication information comprises a terminal identifier of the terminal and a first available wireless network set available to the terminal, and the first available wireless network set comprises one or more wireless networks available to the terminal, wherein the first network trigger device is a packet core network device and the network decision device is a policy control device; and
   triggering the terminal to use a wireless network in the first available wireless network set to perform a service, wherein the triggering the terminal to use the wireless network in the first available wireless network set to perform the service comprises:
      selecting, by the first network trigger device, a second network trigger device based on an attach status of the terminal;
      sending, by the first network trigger device, second indication information to the second network trigger device, to indicate the second network trigger device to trigger the terminal to use a wireless network in the first available wireless network set to perform the service, wherein the second indication information comprises the terminal identifier and a second available wireless network, and the second available wireless network comprises all or a part of the first available wireless network set.

9. The method according to claim 8, wherein the first available wireless network set comprises a single wireless network that corresponds to the packet core network device, and the triggering, by the first network trigger device, the terminal to use the wireless network in the first available wireless network set to perform the service comprises:
   triggering, by the packet core network device corresponding to the single wireless network, the terminal to set up a radio bearer in the single wireless network to perform the service.

10. The method according to claim 8, wherein the selecting, by the first network trigger device, the second network trigger device based on the attach status of the terminal comprises:
    determining a target wireless network from the first available wireless network set;
    selecting the second network trigger device based on the attach status of the terminal and the target wireless network; and
    wherein the second indication information comprises the terminal identifier and the target wireless network.

* * * * *

UNITED STATES PATENT AND TRADEMARK OFFICE
CERTIFICATE OF CORRECTION

PATENT NO. : 11,553,389 B2
APPLICATION NO. : 16/991581
DATED : January 10, 2023
INVENTOR(S) : Biao Zhang et al.

It is certified that error appears in the above-identified patent and that said Letters Patent is hereby corrected as shown below:

In the Specification

In Column 1, Line 11, Delete "2018, The" and insert -- 2018. The --.

Signed and Sealed this
Eighteenth Day of April, 2023

Katherine Kelly Vidal
*Director of the United States Patent and Trademark Office*